United States Patent
Chang et al.

(10) Patent No.: US 10,264,052 B2
(45) Date of Patent: *Apr. 16, 2019

(54) ENVELOPING FOR DEVICE INDEPENDENCE

(71) Applicant: SPATIAL DIGITAL SYSTEMS, INC., Camarillo, CA (US)

(72) Inventors: Donald C. D. Chang, Thousand Oaks, CA (US); Juo-Yu Lee, Camarillo, CA (US); Steve K Chen, Pacific Palisades, CA (US); Jeffrey Chijieh Chang, La Jolla, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,665

(22) Filed: Apr. 14, 2015

(65) Prior Publication Data

US 2016/0050258 A1 Feb. 18, 2016

Related U.S. Application Data

(63) Continuation-in-part of application No. 14/517,717, filed on Oct. 17, 2014.
(Continued)

(51) Int. Cl.
*H04L 29/08* (2006.01)
*H04L 29/06* (2006.01)
*G06F 21/62* (2013.01)

(52) U.S. Cl.
CPC .......... *H04L 67/06* (2013.01); *G06F 21/6209* (2013.01); *G06F 21/6245* (2013.01);
(Continued)

(58) Field of Classification Search
CPC .. H04N 21/236; H04N 21/23608; H04N 7/52; H04N 21/2389; H04N 21/2635;
(Continued)

(56) References Cited

U.S. PATENT DOCUMENTS

| 7,017,045 B1* | 3/2006 | Krishnamachari | ... G06T 1/0071 375/E7.089 |
| 8,224,299 B2* | 7/2012 | Kim | ................... H03M 13/2915 455/414.1 |

(Continued)

OTHER PUBLICATIONS

Siddaraju, Multiplexing the elementary streams of H.264 video and MPEG4 HE AAC v2 audio using MPEG2 systems specification, demultiplexing and achieving lip synchronization during playback, 2010.*

(Continued)

*Primary Examiner* — Hadi S Armouche
*Assistant Examiner* — Huan V Doan
(74) *Attorney, Agent, or Firm* — Phuong-Quan Hoang

(57) ABSTRACT

A system comprises a plurality of personal devices identified by at least one remote storage network as belonging to a user. A personal device comprises a first folder for storing a known a priori digital file, a second folder for storing a data file, a processor, and a network interface. The processor performs an M-to-M waveform multiplexing transformation on M input files, M>1, and generates M output files. Each output file comprises a respective linear combination of the M input files. The M input files comprise the data file and the known a priori digital file. Each of the M output files appears to human perception as having substantially identical visual or audio features to the known a priori digital file. The network interface sends at least M−1 of the M output files to at least one destination in the at least one remote storage network for storage.

20 Claims, 30 Drawing Sheets

Enveloping and de-enveloping
*for cloud storage and transport*

Related U.S. Application Data

(60) Provisional application No. 62/038,767, filed on Aug. 18, 2014.

(52) U.S. Cl.
CPC .......... *H04L 63/08* (2013.01); *H04L 65/4076* (2013.01); *H04L 65/4084* (2013.01); *H04L 65/602* (2013.01); *H04L 65/604* (2013.01); *H04L 65/605* (2013.01); *H04L 65/607* (2013.01); *H04L 67/1097* (2013.01)

(58) Field of Classification Search
CPC ............. H04N 21/2368; H04N 5/9201; H04N 13/161; H04N 21/23614; G06F 21/10; G06F 21/6209; H04W 72/0466; H04J 11/00; G02B 2006/12164; G03H 1/2645
See application file for complete search history.

(56) References Cited

U.S. PATENT DOCUMENTS

| | | | | |
|---|---|---|---|---|
| 2003/0182579 | A1* | 9/2003 | Leporini | H04N 5/913 713/150 |
| 2006/0155786 | A1* | 7/2006 | Seo | G11B 27/102 |
| 2006/0208929 | A1* | 9/2006 | Cho | H04N 7/163 341/50 |
| 2007/0217551 | A1* | 9/2007 | Kang | H04H 60/11 375/343 |
| 2008/0226118 | A1* | 9/2008 | Chen | G06T 1/0028 382/100 |
| 2009/0028192 | A1* | 1/2009 | Rieger | H04H 20/42 370/535 |
| 2009/0040997 | A1* | 2/2009 | Oh | H04N 21/4382 370/345 |
| 2010/0104013 | A1* | 4/2010 | Matsumoto | H04N 21/2368 375/240.15 |
| 2010/0329329 | A1* | 12/2010 | Reznik | G06F 17/147 375/240.2 |
| 2011/0197740 | A1* | 8/2011 | Chang | G10H 1/361 84/610 |
| 2012/0319885 | A1* | 12/2012 | Chang | H03F 1/0277 341/155 |
| 2013/0329806 | A1* | 12/2013 | Tu | H04N 19/00951 375/240.18 |
| 2014/0098891 | A1* | 4/2014 | Abe | H04N 19/00551 375/240.24 |
| 2014/0192155 | A1* | 7/2014 | Choi | H04N 19/00769 348/43 |
| 2014/0270705 | A1* | 9/2014 | Solonsky | H04N 19/176 386/252 |
| 2014/0301450 | A1* | 10/2014 | Alshina | H04N 19/00078 375/240.03 |
| 2015/0229989 | A1* | 8/2015 | Gavade | H04N 19/46 725/31 |

OTHER PUBLICATIONS

Skraparlis, Design of an Efficient Authentication Method for Modern Image and Video, IEEE, 10 pages (Year: 2003).*

Rezaei et al., Joint Video Coding and Statistical Multiplexing for Broadcasting Over DVB-H Channels, IEEE, 10 pages (Year: 2013).*

Extron Electronics, Multiplexing AV Signals in Fiber Optic Systems, 10 pages (Year: 2012).*

* cited by examiner

ENVELOPING FOR DEVICE INDEPENDENCE

RELATED APPLICATIONS

This application claims the continuation-in-part (CIP) benefit of a U.S. non-provisional application Ser. No. 14/517,717, entitled "Digital Enveloping for Digital Right Management and Re-broadcasting," filed Oct. 17, 2014, which claims the benefit of U.S. provisional application Ser. No. 62/038,767, entitled "Enveloping and De-enveloping for Cloud Computing via WF Muxing," filed Aug. 18, 2014. This application is also related to a non-provisional application Ser. No. 12/848,953, filed on Aug. 2, 2012, a non-provisional application Ser. No. 13/938,268, filed on Jul. 10, 2013, a non-provisional application Ser. No. 13/953,715, filed on Jul. 29, 2013, a non-provisional application Ser. No. 14/512,959, filed on Oct. 13, 2014, a non-provisional application Ser. No. 14/543,918, filed Nov. 18, 2014, and a non-provisional application Ser. No. 14/565,435, (enveloping via digital audio) filed Dec. 10, 2014, all of which are incorporated herein by reference in their entireties.

BACKGROUND OF THE DISCLOSURE

Field of the Disclosure

The disclosure relates to methods and architectures of packing or enveloping data for cloud storage and transport using Wavefront multiplexing (WF muxing). It is focused to appearance of data package/envelop and reliability of enclosed data.

According mailonline (http://www.dailymail.co.uk) on Aug. 31, 2014, naked images of high-profile actors, models, singers and presenters have been leaked online in an apparent hacking leak linked to the Apple iCloud service. The photos appeared after a user on 4chan, an image sharing forum, posted private pictures of 101 celebrities including Jennifer Lawrence, Ariana Grande, Victoria Justice and Kate Upton. The images, which were posted on Sunday night, were reportedly accessed due to an iCloud leak_that enabled celebrities' phones to be hacked. Apple has declined to comment. Privacy of the celebrities were terribly violated.

There are needs for better privacy protection on cloud. Enveloping techniques will enhance privacy protection on cloud.

WF muxing techniques have been presented extensively in the above mentioned US patent applications (Ser. Nos. 12/848,953, 13/938,268, 13/953,715. The WF muxing techniques will use less memory space to achieve better redundancy, reliability, and survivability as compared to conventional techniques. In addition, these techniques enable capabilities of monitoring integrity of stored data sets without scrutinizing the stored data sets themselves. The same techniques can be extended to data streaming via cloud.

There are two more concerns. Many operators offer secured and encrypted storage services. However, secured files are only encrypted on the server side and therefore a client has to rely on honesty of the server operator. The second is concerns about the right of stored data; which are under debate.

Applications of WF muxing address enhanced privacy, and reliability of data transports and stored data on cloud. Many of the data may even be image or audio related. Since multiple data sets to be transported or stored will be preprocessed on client sides, each of the transported or stored data on cloud is a multiplexed (muxed) data set individually which is unintelligible by itself. Therefore, the proposed approaches shall remove the concerns on professional integrity confidence of operators, and those on the right of stored data. Known images, audio tracks, or multimedia streams may all be used as digital "envelopes" for cloud data storage and transport. Most applications are aiming for games and entertainments in cloud communications. It may be applied as tools for various digital right management on copy right, protecting IP holders. Authentications with known "chokes or stamps" via these techniques for multilayer enveloping will be one highlight of this patent application.

Digital videos from remote cameras will be used to exemplify the digital enveloping/de-enveloping techniques in this patent application. Other types of digital streams may be easily incorporated for the proposed enveloping techniques.

Embodiments of "writing" and "reading" processes will be summarized and presented concisely. "Writing" features a process on multiple original images concurrently via WF muxing transformations, generating WF muxed data to be stored on cloud. A "reading" process corresponds to a WF demuxing transformation on WF muxed data stored on cloud, reconstituting original data sets. The enveloping is a subset of "writing" procedures under constraints that enveloped messages, or products of the writing procedures, shall preserve some desired features in digital appearance, and the de-enveloping is a subset of reading procedures to reconstitute embedded mails from the enveloped messages.

Enveloping process is subsets of WF muxing process. A customized set of WF muxing on multiple digital files as inputs including at least a data message file and a selected digital envelop file, is configured to guarantee at least one of the multiple outputs comprising a weighted sum of all inputs with an appearance to human natural sensors substantially identical to the appearance of the selected digital envelop in a same image, video or audio format.

The output file features enveloped or embedded messages. The embedded message can be reconstituted by a corresponding WF demuxing processor at destination with the known a priori information of the original digital envelope. In short, digital enveloping/de-enveloping can be implemented via WF muxing and demuxing formulations. WF muxed data featured enhanced privacy and redundancy in data transport and storage on cloud. On the other hand, data enveloping is an application in a different dimension for most of WF muxing applications as far as redundancy is concerned. Enveloped data are intended only for limited receivers who has access to associated digital envelope data files with enhanced privacy for no or minimized redundancy.

SUMMARY OF THE DISCLOSURE

Wavefront multiplexing/demultiplexing (WF muxing/demuxing) process features an algorithm invented by Spatial Digital Systems (SDS) for satellite communications where transmissions demand a high degree of power combining, security, reliability, and optimization. WF muxing/demuxing, embodying an architecture that utilizes multi-dimensional transmissions, has found applications in fields beyond the satellite communication domain. One such application is data transport/storage on cloud where privacy, data integrity, and redundancy are important. Enveloping and de-enveloping on digital data may be used for both data transport and data storage. They may be used for gifts and games such as digital fortune cookies. We will use data transport, such as delivering mails, to exemplify the concept of enveloping and de-enveloping digital data.

This invention is about to send not all but a portion of WF muxed data strings through cloud to destinations. An enveloped data streams are WF muxed with a known data files as an envelope which may be a sender's personal picture indicating who is sending the enveloped (embedded) data string. Different envelops may feature various voice recordings of sender's indicating sender's mood while sending the enveloped data. The digital envelopes may be an old digital voice recording clip for delivering new digital data streams for communications among family members only. All family members shall have access to the original old voice recording clip.

WF muxing/demuxing for enveloping are configured to use additional known digital data streams for probing, authentications and identifications. A method for enveloping and then storing data in IP cloud comprises: transforming multiple first data sets into multiple enveloped second data sets at a transmitting side, wherein one of said enveloped second data sets comprises a weighted sum of said first data sets; storing said enveloped second data sets in an IP cloud via an internet; and storing multiple links linking to said enveloped second data sets at said transmitting side.

A data processing method comprises: transforming multiple first data sets and a known data set into multiple enveloped second data sets at a transmitting side, wherein one of said enveloped second data sets comprises a weighted sum of said first data sets; and recovering a third data sets from some of said enveloped second data sets and said known data set at a receiving side, wherein one of said third data sets comprises a weighted sum of said some of said enveloped second data sets.

A method for storing data in IP cloud, comprises: transforming multiple first data sets into multiple enveloped second data sets at a transmitting side, wherein one of said enveloped second data sets comprises a weighted sum of said first data sets and carries an image with intensities mainly controlled by one of said first data sets.

Similar inventions about how to use enveloping techniques for digital right management were detailed in the Ser. No. 14/517,717, entitled "Digital Enveloping for Digital Right Management and Re-broadcasting," filed Oct. 17, 2014. An original digital document is referred to as a mother edition of the document. Additional copies are generated as children editions; each will have unique identifiers embedded via the enveloping techniques with the mother edition as the digital envelop. The identifier associated with a child addition can only be recovered via processing with the mother edition. Only the children editions will be published and distributed, and the mother edition will be stored securely.

Mathematically, the mother edition document is represented as A and the identifier document for an x child edition as Dx. Since enveloping processing is a linear processing, the x-edition is related to $X=M*A+Dx$, where M is magnification factor and shall be greater than 1 under a boundary condition to enable the appearance of X substantially identical to that of the mother edition as far as to all nature human sensors are concerns. The Dx information is embedded and/or hided in the X; the child edition of the digital document, and is not intelligible through the X file alone.

A y child edition will be associated with another different Dy identifier.

In order to recover information on Dx from X, the recovering process will perform the operation of $Dx=X-M*A$ or its equivalent, with the mother edition A available.

Similar techniques can be extended for broadcasting to deliver additional information to audience. A first mother document is represented as A and a second document as B. Since enveloping processing is a linear processing, the rebroadcasting-edition is related to $X=M*A+B$, where M is magnification factor and shall be greater than 1 under a boundary condition to enable the appearance of X substantially identical to that of the mother document A as far as to all nature human sensors are concerns. The B information is embedded and/or hided in the X; the re-broadcasting edition of the digital document, and is not intelligible through the X file alone. In order to recover information on B from X, the recovering process will perform the operation of $B=X-M*A$ or its equivalent, with the mother edition A available.

Re-broadcasting may come from different channels concurrently, or same channel on different time, or different channel different time. This techniques can be used for DBS, Cable, Fiber, and other wireless or wired networks for either audio or video broadcasting. The embedded documents, B, may be other separated and different TV programs, housekeeping data for set-top-boxes, broadcasted Internet data to selected.

Cloud computing enables a user to access all his or her applications and documents from anywhere in the world, freeing the user from the confines of the desktop. This invention comprises techniques on how to enhance privacy via enveloping/de-enveloping for device independence in cloud computing. Embedded data by the enveloping techniques may be digital voices, image, video, or other digital data. We use 4-to-4 WF muxing to exemplify the implementations, introducing customized enveloping/de-enveloping with other known digital files or parameters.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

DETAILED DESCRIPTION OF THE INVENTION

The present invention relates to distributed transport paths or storage with built-in redundancy via an M-to-M wavefront multiplexing (WF muxing) techniques; where $M \geq 2$ and must be an integer. The M inputs to the WF muxing comprising N streams of information data with additional M−N known data files; where $N \geq 1$ and is an integer. The M independent input data streams are transformed and concurrently converted into WF muxed domain with M output wavefront components (wfcs). Only M' of the M outputs will be used for data transport and/or data storage on cloud, where $M-N \leq M' \leq M$; where M' is an integer.

Furthermore, any one of the known data files may be chosen to serve as a digital transporting envelop and will be processed accordingly in an enveloping process as a part of the M-to-M WF muxing.

Multiple inputs to an M-to-M WF muxing processor are properly "emphasized" or "weighted" so that at least one of the M outputs will be selected to be a "carrier" for transporting embedded message. A selected "carrier", an enveloped data file, shall appear substantially identical to the appearance of the selected digital envelop to human sensors. The identical appearance comprises unique and easily distinguishable features from other digital data files. These features may be visual pictures, videos, audio music, word files, or multimedia files At least one of the enveloped data streams will be sent to a destination via cloud. An enveloped data stream may appear as a digital picture, a video clip, a music clip, an audio recording, or a digital cartoon while being transported or stored on cloud. Just as functions of regular envelops, these digital envelops may convey context and authors of the embedded mail, a preview of intentions and moods of the author, and or information of where the embedded mail coming from.

The digital envelop and the enveloped digital data stream shall have substantially identical features which are identifiable and distinguishable by human sensors; hearing, visually or both.

At destination, a desired receiver shall reconstitute the embedded information data by a post processing such as wavefront demultiplexing (WF demuxing) with the help of accessing the known file of the original digital envelop.

Figure 1:
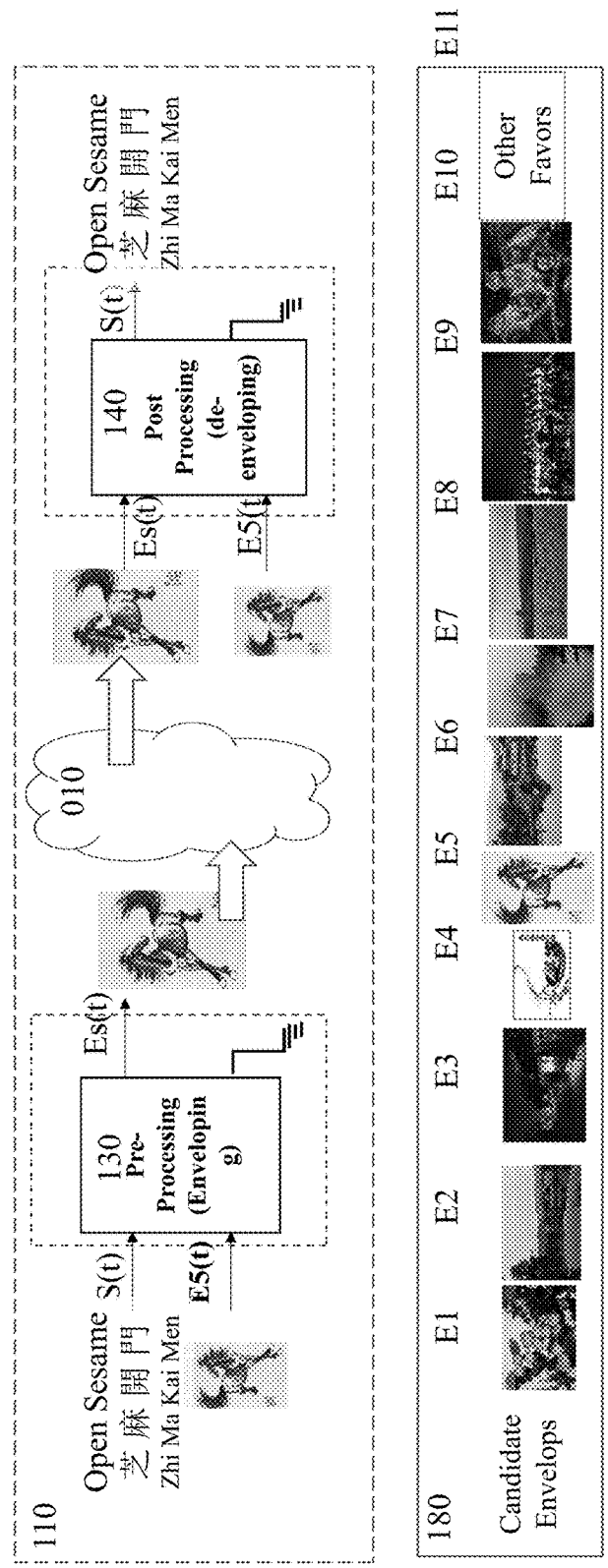
FIG. 1 depicts a block diagram on "sealing" a digital envelope for an embedded digital file via a 2-to-2 WF muxing processor by a sender at a source, sending only one of the two outputs as the digitally enveloped data to a destination via cloud, and opening the digital envelop and recovering the embedded data in accordance to some embodiments of this invention. The digital envelope is chosen by the sender from one of the known candidate digital envelopes to both the sender at the source and the receiver at the destination. The sealing and opening process for an envelope are also referred as enveloping and de-enveloping, respectively.

The present invention discloses operation concepts, methods and implementations of enveloping/de-enveloping via wavefront multiplexing for cloud transport as depicted in FIG. 1. Similar techniques can be applied to video streaming, secured data storage services, secured file transfers, and other applications via Internet Clouds. The embodiments of present inventions comprise three important segments including (1) the pre-processing for enclosing a mail in a selected envelope, i.e. the above WF muxing, at a user end; (2) transporting embedded mails via enveloped digital streams on cloud, and (3) a post-processing of retrieval or de-enveloping, i.e. the above WF demuxing, at the user end. We will use a single user for both pre-processing and a post-processing as an example for illustrating the operation concepts.

In principle, the pre-processing and the post-processing are all performed in user segments and performed in equipment at the user end. For cloud storage, these enveloping/ de-enveloping may also be performed in storage facilities of an operator. The operator will aggregate the data storage sets in cloud distributed over remote networks.

Embodiment 1

FIG. 1 depicts an operation concept of communications between a sender at a source and a receiver at a destination. The sender takes advantages of a 2-to-2 WF muxing processor 130 for sealing or enveloping a set of input data S(t) by a selected digital envelope E5(t). The input data is an English phrase "Open Sesame" and its Chinese translation in a word format written in 4 Chinese characters and associated pronunciation symbols. The chosen digital envelope is a digital picture of a famous painting of "a running horse" by a Chinese painter, Xu Beihong, in early 1900's. There are 11 digital envelopes 180 commonly known to a user community which both the sender and the receiver belong to. There are two outputs from the WF muxer 130; one is for the enveloped mail Es(t), and the other is grounded. The Es(t) is a result of pixel-by-pixel processing from the two inputs data files; S(t) and E5(t). The WF muxing features a 2*2 Hadamard transform. S(t) and E5(t) will be "scaled" properly to enable Es(t) appearance substantially identical to that in E5(t); as discussed extensively in the US patent application publication no. 2014/0081989A1. In this case, the running horse in Es(t) appears to be a flipped image of the same house in E5(t).

After the WF muxing, Es(t) is an enveloped data stream, and is the only file to be sent to a destination via IP networks 010. Es(t) features with a visual appearance nearly identical to the picture of the famous running horse in E5(t). At the destination, a receive can reconstitute the embedded message of "Open Sesame" written in Chinese via a 2*2 WF demuxer 140 or an equivalent post processor; only when the digital picture of the original envelop is available to the receiver. There are three segments including (1) a pre-processing 130, (2) IP propagation Channel 010, and (3) post processing 140 at downstream of the cloud.

Pre-Storage Processing 130:

In the pre-processing for mail enveloping, an 2-to-2 WF muxer 130 is used to convert 1 set of input mail data S(t) and a selected digital envelop string E5(t) to two output data strings, i.e. Es(t), and Ed(t), where:

$$Es(t)=S(t)+am*E5(t) \quad (1\text{-}1)$$

$$Ed(t)=-S(t)+am*E5(t), \quad (1\text{-}2)$$

where am>>1 is a magnification factor, and image dependent, usually set between 5 and 30.

A 2-to-2 Hadamard matrix (HM), in which all elements are "1" or "−1" only, is chosen for the 8-to-8 WF muxing. Equations (1-1) to (1-2) can be written in a matrix form as $$O=HM*I \quad (2)$$

where:

$$O = [O1, O2]^T = [Es(t), Ed(t)]^T \quad (2\text{-}1)$$

$$HM = \begin{bmatrix} 1 & 1 \\ -1 & 1 \end{bmatrix} \quad (2\text{-}2)$$

$$I = [I1, I2]^T = [S(t), am*E5(t)]^T \quad (2\text{-}3)$$

The input ports of a WF muxer are referred to as slices, and its output ports are wavefront components (wfc's). The two input data sets S1 and am*E5, are connected to the input ports, i.e. slice 1, and slice 2 of the WF muxer respectively. The 2 output data sets i.e. O1-O2, are connected to the output ports, i.e. wfc1-wfc2, of the WF muxer 130 respectively.

In general a 2-to-2 WF muxing processor features 2 orthogonal wavefront vectors or WFV's. Let us define a coefficient wjk of a WF transformation to be the coefficient at the $j^{th}$ row and $k^{th}$ column of the WF muxer 130. A WF vector of the WF muxer 130 featuring a distribution among the 2 outputs, i.e. O1-O2 at the 2 WF component ports wfc1-wfc2, is defined as a 2-dimensional vector. They are mutually orthogonal. The two WFVs of the WF muxer 101 are:

$$WFV1=[w11,w21]^T=[1,-1]^T \quad (3.1)$$

$$WFV2=[w12,w22]^T=[1,1]^T \quad (3.2)$$

S(t), and E5(t) are "attached" to the 2 WF vectors by respectively connected to the two input ports of the WF muxing device 130. All components of the 2 orthogonal WFVs are related to input and output port numbers or (spatial) sequences, but are independent from the input and output data sets.

The arithmetic operations of "linear combinations" may operate on blocks of data after all inputs are aligned as digital streams sample-after-sample for various inputs. A "byte" of data may be "selected" as a sample and a block of X samples, i.e. 7 samples or 7 bytes, of a digital data stream will be treated as a numerical number for calculations in WF muxing transformations. Two streams of 7 samples or bytes may be the respective inputs of the 2-to-2 WF muxer. A block size of X+1 samples, i.e. 8 samples or 8 bytes in this case, will be reserved for the results of arithmetic operations on a number of the digital streams to avoid issues of overflows and underflows at the two outputs of the WF muxing transformations. There shall be 12.5% in data size overhead of the 7 byte arithmetic operations, with respect to the results in 8 byte forms in the outputs. In different embodiments, we may choose blocks with a block length of 99 bytes for arithmetic operation, i.e. X=99, reducing the operation overhead to 1%.

There are other choices in selecting data blocks for arithmetic operations of linear combinations or weighted sums in the WF muxing transformations. For imaging processing, a pixel by pixel as operation blocks may be more important preserving unique features for some applications, or a row or a column of pixels as a data block for efficient usage of storages.

In this example, only one of the two outputs will be delivered to a destination. The intended receiver must have "additional information" in order to reconstitute the embedded message or mail; "Open Sesame" and its Chinese translation in a word format written in 4 Chinese Characters. The additional information is the original file of the selected digital envelop. If both outputs were delivered to the receiver, both the embedded mail and the selected original digital envelop could all be reconstituted independently at the destination without any additional a priori known information.

In general at least one of WF muxed output streams from higher order muxing or multilayer enveloping will be sent to the destination 140 via IP cloud 010. The embedded mail is in the enveloped digital data stream. The higher order muxing is usually referred to an N-to-N WF muxing with N in between 4 and 5000. The numbers of WF muxed streams to be sent to a destination shall be always smaller than a critical numbers of muxed data streams; Ncr. There are not enough information in the Ncr independent muxed data streams to reconstitute the embedded information without any additional information known a priori.

Cloud 010:

Only one WF muxed file is sent from a source to a destination via the cloud 010. The original digital envelope file is known a priori to both the sender at a source and receiver at the destination. Therefore the required channel bandwidth for Es(t) is about the same as that of the embedded message, S(t). The differentials in required bandwidths between that for Es(t) and that for S(t) are due to processing overhead.

Post Processing 140:

The post processing 140 for data retrieval comprises a WF demuxing processor, converting the received WF muxed data into an output of embedded data file. The original digital envelope file, E5(t), is also used as one of the inputs to the WF demuxing in the post processing. The received WF muxed data is substantially equivalent to the corresponding output data set, Es(t), of the WF muxing device in the preprocessing 130, if not contaminated, and is therefore represented by Es(t) or Es'(t). Similarly, the recovered embedded data file is substantially equivalent to the input data sets, S(t), and is therefore referred to as S(t) or S'(t).

According to equation (1-1); the recovered embedded data can be derived from the received WF muxed data Es(t) and the digital envelope E5(t);

$$S(t)=Es(t)-am*E5(t) \quad (4)$$

where am can be experimentally optimized or through a priori knowledge set. Therefore, the missing second output of the WF muxing can also be re-constructed in the destination according to Equation (1-2) and Equation (4)

$$Ed(t)=-Es(t)+2*am*E5(t), \quad (5)$$

A 2-to-2 Hadamard matrix with scaling factor of ½ may be chosen as the 2-to-2 WF demuxer. The matrix elements of 2-to-2 Hadamard matrix feature "1" or "−1" only. The relationship may be written in a matrix form as $$SM=HM*D \quad (6)$$

$$\text{where: } D=[D1,D2]^T=[Es(t),Ed(t)]^T \quad (6\text{-}1)$$

$$SM=[S(t),am\ E5(t)]^T \quad (6\text{-}2)$$

HM is a 2-to-2 Hadamard matrix in equation (2-2).

The input ports of a WF demuxer in the post processor 140 are referred to as wavefront components (wfcs), i.e. wfc1, and wfc2, and its output ports are slices, i.e. slice1, and slice2. In this example, the 2 input data sets, i.e. Es(t) and Ed(t), are connected to its input ports wfc1-wfc2 of the WF demuxer 140, respectively. The retrieved data set, S1, is from its first output ports. Normally the second output of the demuxing device 140 will be "grounded" for this application.

As an option, the respective second output from the WF demuxing device 140 may be used to reconstitute a copy of the original digital envelop which will be compared to the known digital envelope file for the integrity of received data. It is a good indication that the received embedded data has been compromised only if a set of comparison results showing the two digital envelopes are different digital files.

Figure 1A:
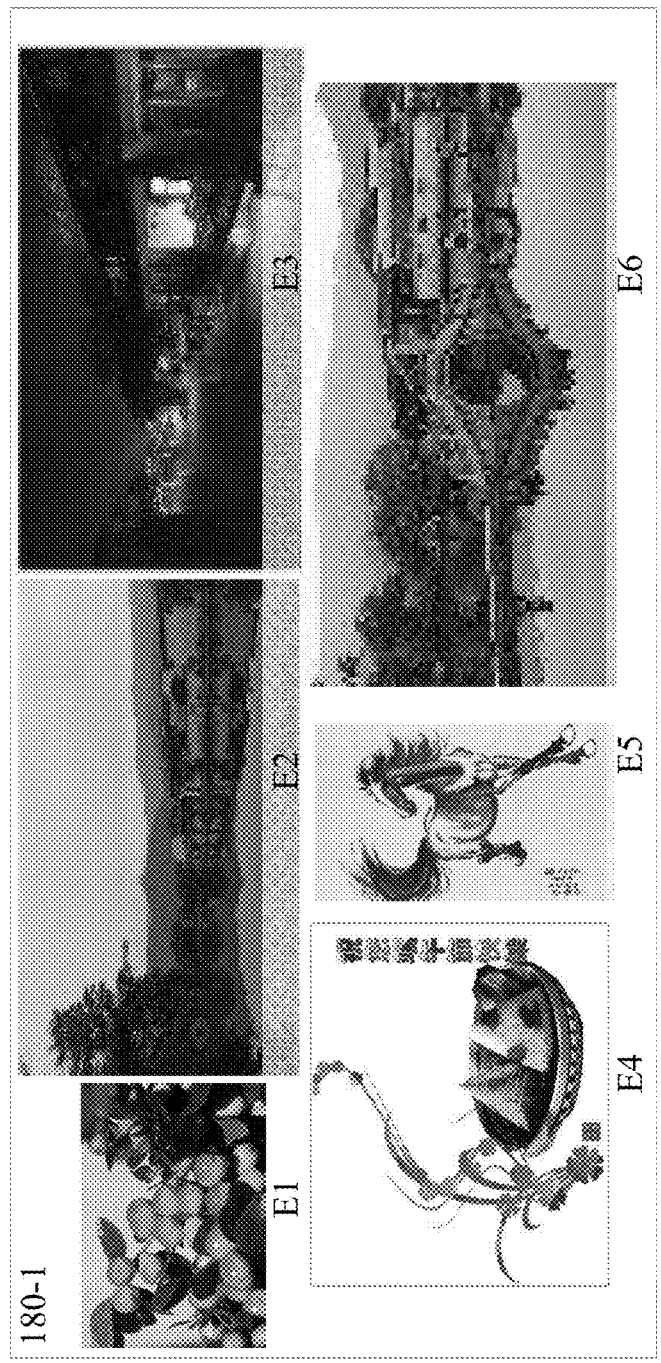
FIG. 1A depicts a set of 6 candidate digital envelopes according to embodiments of this invention.
Figure 1B:
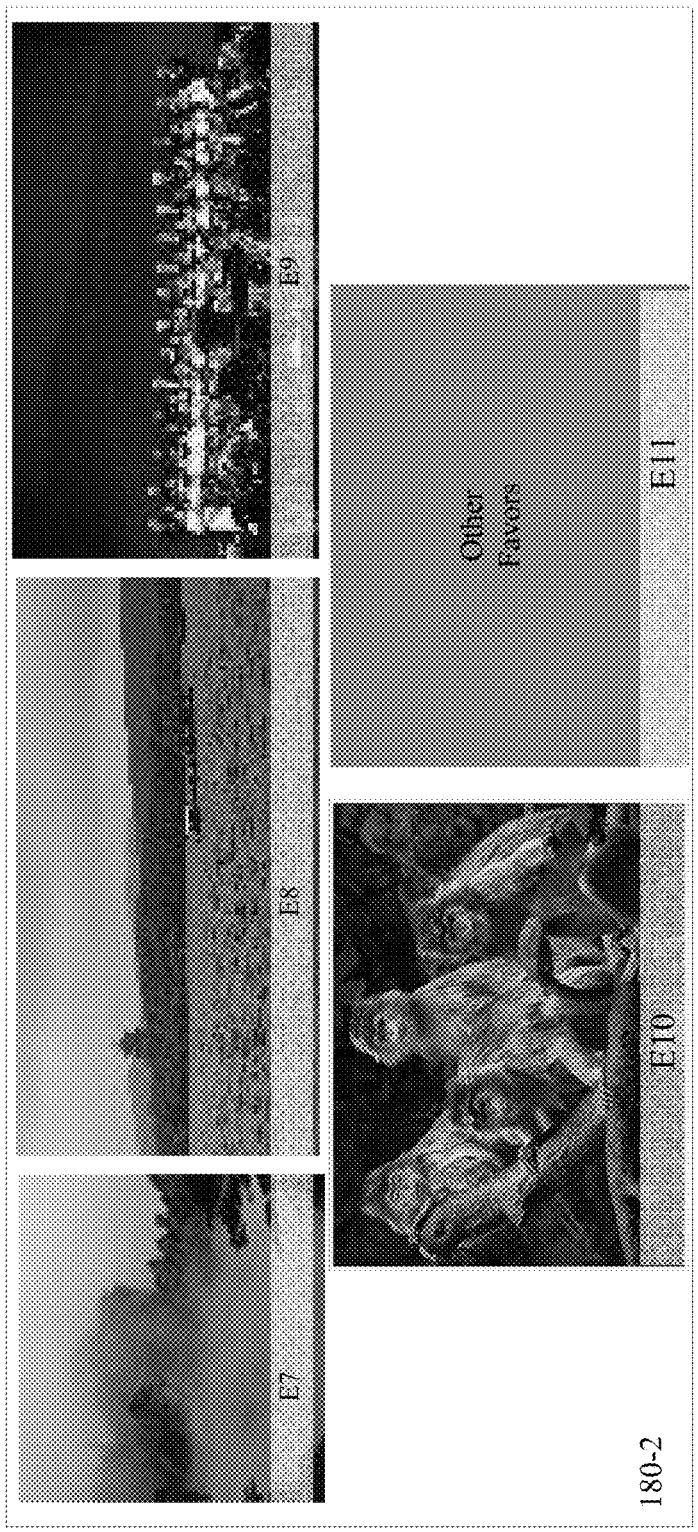
FIG. 1B depicts another set of 5 candidate digital envelopes according to embodiments of this invention.

FIG. 1A and FIG. 1B depict candidates for 6 and 5 digital envelopes, respectively. E5(t) is chosen for the example in FIG. 1. E11 in FIG. 1B is a category of common known digital files between a sender and a receiver for private communications between them.

Figure 2:
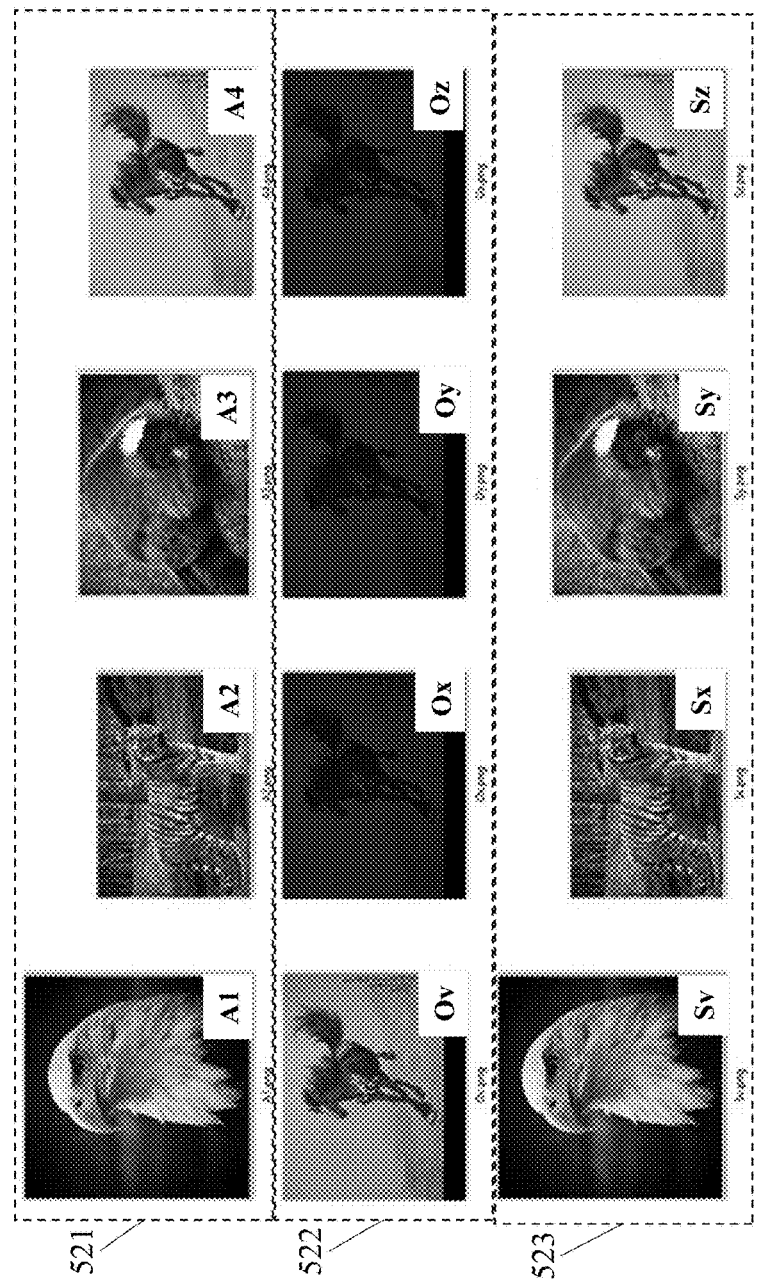
FIG. 2 depicts a replicates of the FIG. 5D in U.S. patent application Ser. No. 13/953,715; published with a PA publication No. US 2014-0081989 A1; demonstrating computer simulated results of Camouflaging. The four images are inputs to a 4-to-4 WF muxing processor. The running horse was chosen as the digital camouflaging image. Effectively, the four images on the second rows are enveloped data sets, according to some embodiments of this invention.

FIG. 2 is a replica of FIG. 5D in the U.S. patent application Ser. No. 13/953,715 with a publication No. 20140081989. It illustrates an example of WF muxing/demuxing as pre-processing and post processing for a data storage application on cloud, presenting image storage/retrievals via 4-to-4 wavefront muxing on distributed cloud storages. The WF muxing/demuxing may be via orthogonal matrixes or non-orthogonal matrixes, as long as their inverse matrixes exist. It depicts the original inputs in the first row 521, stored images or images to-be-transported in wavefront muxed formats in the second row 522, and reconstituted and recovered images at a destination in the third row 523. The four pictures on the top row 521 are four input images; 3 photos token recently at Bronx Zoo in city of New York, and the $4^{th}$ one is an image of a classic painting, "a running horse", by a famous Chinese painter Mr. Xu Beihong in 1930's. The first, the second and the third photos depict, respectively, a picture of an "Eagle" indicated as A1.png, a picture of a "Tiger" indicated as A2.png, and a picture of a "white head animal" indicated as A3.png. The "horse" is depicted as A4.png. They are all in PNG formats.

Let us assume a 4-to-4 Hadamard transform as the WF muxing matrix.

The 4 WF muxed files Ov, Ox, Oy and Oz are in the second row 522. To create various camouflaged effects on the WF muxed data for storage; the original images have been "heavily weighted" for the "horse" painting. In order to assure that the A1 image of the Chinese horse painting to be more dominant features in the 4 multiplexed outputs as camouflaged, we have emphasized the pixel intensities of A1 via:

$$\begin{bmatrix} O1 \\ O2 \\ O3 \\ O4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} am*A1 \\ A2 \\ A3 \\ A4 \end{bmatrix} \quad (7)$$

where am>1. Usually am is set to be greater than 10. It is also assumed the dimensions of pixel lattices among the 4 input images have been fully equalized. Depending on the selection of a camouflaging image, the emphasizing factor, am, may applied to any of the input images in ‖A‖. Furthermore, equation (7) may also be written equivalently as:

$$\begin{bmatrix} O1 \\ O2 \\ O3 \\ O4 \end{bmatrix} = \begin{bmatrix} +am & +1 & +1 & +1 \\ +am & -1 & +1 & -1 \\ +am & +1 & -1 & -1 \\ +am & -1 & -1 & +1 \end{bmatrix} \begin{bmatrix} A1 \\ A2 \\ A3 \\ A4 \end{bmatrix} \quad (7\text{-}1)$$

As a result, the image of "horse" painted by Xu Baihong becomes dominant among the 4 participating images and appears on all 4 WF muxed data, i.e. Ov, Ox, Oy and Oz, with appearances of various intensity settings.

Additional processing is required before the WF muxing to "flip, rotate, zone-in or zone-out" images or appearances on the WF muxed files with respect to the appearance of the digital envelope.

Each of the WF muxed data sets Ov, Ox, Oy and Oz features a size about 2 to 3 times larger than those of the original images A1-A4 or recovered images Sv, Sx, Sy and Sz to avoid overflow and underflow in the simulations.

The images on the third row are restructured images via a reading process. A "reading" processing also features two steps. The first step involves retrieving all 4 WF muxed files individually from cloud. The second step involves via a wavefront demultiplexing transformation, converting the 4 WF muxed files, i.e. Ov, Ox, Oy and Oz, in ‖O‖ into four recovered or reconstituted equalized files Sv, Sx, Sy and Sz in ‖S‖ substantially equivalent to the four equalized pictures A1-A4 respectively if the WF muxed files, i.e. Ov, Ox, Oy and Oz, are not contaminated. The four recovered or reconstituted equalized image files may then be converted via a de-equalizing process into four recovered or reconstituted image files Sv, Sx, Sy and Sz substantially equivalent to the four original pictures A1-A4 respectively.

Assuming all four files Ov, Ox, Oy and Oz are available, the WF demuxing transformation (WF demuxing) shall follow:

$$\|S\| = \|WDmx\| \|O\|. \quad (8)$$

where, $\|WDmx\| \|WMux\| = \|I\|$. \quad (8-1)

More explicitly, "intensities" of individual pixels, in the lattice of the same row and column, of the 4 reconstituted images in Sv, Sx, Sy and Sz in ‖S‖ are 4 respective linear combinations, each of which is a linear combination of intensities of individual pixels, in the lattice of the same row and column, of the four WF muxed files, i.e. Ov, Ox, Oy and Oz, in ‖O‖, multiplied by four respective weighting parameters in ‖WDmx‖. For example, "intensities" of individual pixels, in the lattice of the $41^{th}$ row and $51^{th}$ column, of the 4 reconstituted or recovered images in Sv, Sx, Sy and Sz in ‖S‖ are 4 respective linear combinations of intensities of each individual pixels, in the lattice of the $41^{th}$ row and $51^{th}$ column, of the four WF muxed files, i.e. Ov, Ox, Oy and Oz, in ‖O‖, multiplied by four respective weighting parameters in ‖WDmx‖.

For applications of enveloping, only one of the 4 WF muxed files is sent to a destination from a sender at a source via cloud instead of sending all 4 WF muxed files to cloud. As an example, A1 is the information data to be delivered to a destination via cloud and A4 is a selected digital envelope file. A2, A3 and A4 are known a priori to both the sender and a desired receiver at the destination.

Any one of the 4 files on the second row 522 can be used to convey the embedded message A1 via cloud. Let us select Ov. as the enveloped data file to be transported to destinations. It is clear that the image on enveloped data file, Ov, is a running horse which is substantially identical to the running horse image on the enveloping file, A4. The enveloped file, Oy, comprising information of the embedded message, A1, is the one to be sent to destinations via cloud.

We will not repeat all mathematical details on the Figure here. In short, we utilize the same mathematical manipulations for "enveloping" digital messages or embedding mails for cloud transport as those in "camouflaging" pictures in the above mentioned patent application. We want to show two important features of WF muxing/demuxing in the enveloping/de-enveloping applications. For an enveloping processing by a selected digital envelope (A4);

1) selected message (A1) are embedded in a selected enveloped data set (Ov),
2) to human sensors, the original digital envelope (A4) and the enveloped data set (Ov) shall appear substantially identical, and distinguishable from other digital data sets (A2, A3 and A1) clearly.
3) A2 and A3 may serve for purpose of authentication or identifications In another scenario, where A1 is the data set to be sent to a destination via cloud, A2 and A3 for authentication, and A4 as a selected digital envelope, Ov and Oz are sent to cloud. At the destination, a first reader has all three digital data file A2, A3, and A4, and only needs to access 1 of the 2 enveloped data files on cloud; Ov or Oz to recover the embedded images, Sv. It is important to notice that there is redundancy in wavefront multiplexed images as far as the first reader is concerned. On the other hand, a second reader does not have the digital "horse" A4 but has original digital files for both A2 and A3 and he must download both of two enveloped data files Ov and Oz sent via cloud in order to recover a the embedded image, A1. It is also important to notice that the second reader has the capability to capture the file of the digital envelope A4 for later usage.

For a third scenario, where A1, A2, and A3 are the data sets to be sent to a destination via cloud, and A4 as a selected digital envelope, Ov, Ox, and Oz are sent to cloud. At the destination, a first reader has only has a digital data file A4, and needs to access all 3 enveloped data files on cloud; Ov, Ox, and Oz to recover the embedded images, Sv. It is important to notice that there is no redundancy in wavefront multiplexed images as far as the first reader is concerned. On the other hand, a second reader does not have the digital "horse" A4 and he may download all two enveloped data files Ov, Ox and Oz sent via cloud, but he will not be able to reconstitute the embedded image, A1.

For a fourth scenario, where A1, A2, and A3 are the data sets to be sent to a destination via cloud, and A4 as a selected digital envelope, Ov, Ox, Oy, and Oz are sent to cloud. At the destination, a first reader has only has a digital data file A4, and needs to access any 3 of the 4 enveloped data files on cloud; Ov, Ox, Oy, and Oz to recover the embedded images, Sv. It is important to notice that there is redundancy in wavefront multiplexed images as far as the first reader is concerned. On the other hand, a second reader does not have the digital "horse" A4 and he must download all four enveloped data files Ov, Ox Oy, and Oz sent via cloud, in order to reconstitute the embedded image, A1. There is no redundancy in wavefront multiplexed images as far as the second reader is concerned.

Embodiment 2

Figure 3:
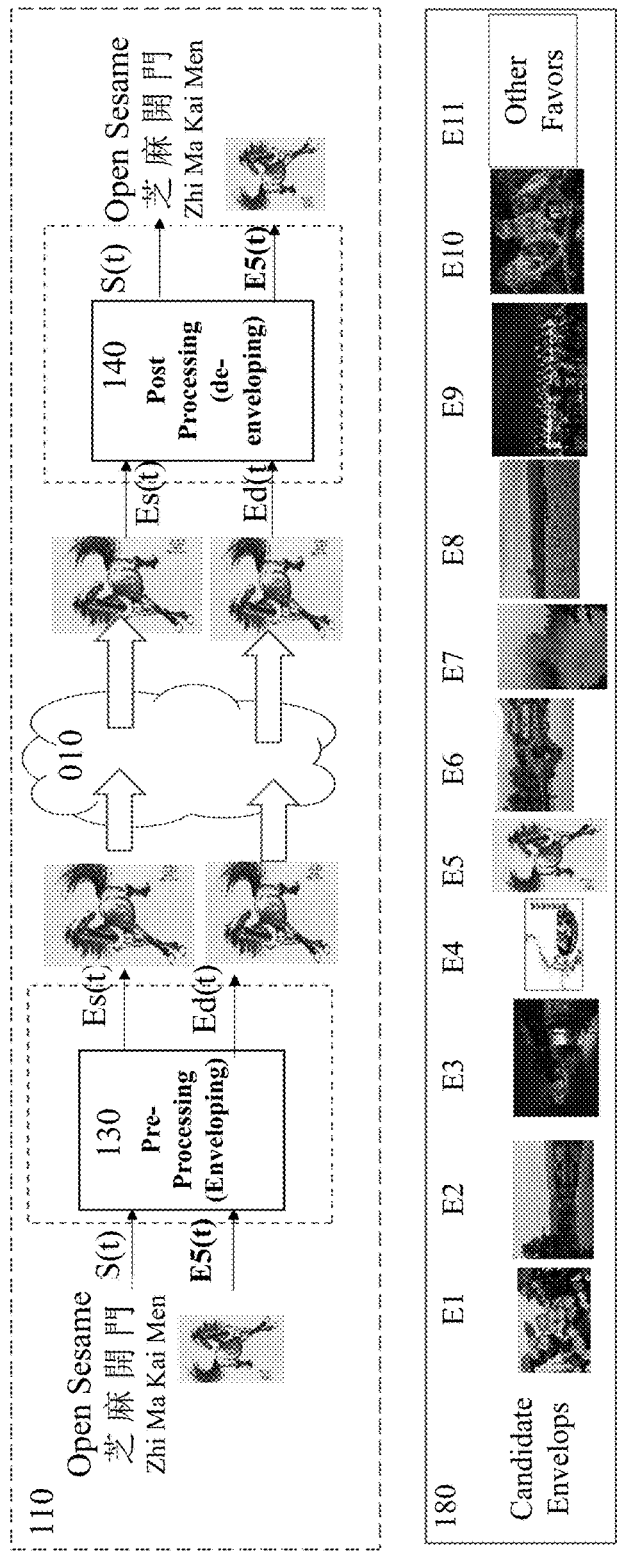
FIG. 3 depicts a block diagram on enveloping/de-enveloping via a 2-to-2 Wavefront muxing techniques when a receiver in a destination does not have access to original digital envelope according to some embodiments of this invention. It is similar to the one in FIG. 1. The senders send both outputs to a receiver for recovering the original digital envelop and embedded information data via a WF demuxing processor as a post processor.

FIG. 3 depicts an operation concept of using the above WF multiplexing techniques for 2 enveloped messages. There are three segments: (1) a pre-processing or enveloping 130, (2) transported via cloud 010, and (3) post processing or de-enveloping 140. It is nearly identical to the one shown in FIG. 1. FIG. 3 features a technique to send a digital data set and an original envelope to a desired receiver. Both outputs of the pre-processor 130, Es(t) and Ed(t) are sent to the receiver.

A message are embedded in the 2 enveloped data file Es(t) and Ed(t) are sent from a sender at a source to a receiver at a destination. The receiver utilizes both enveloped data sets to recover the embedded message and the original digital envelop which may be used for subsequent transmissions between the sender and the receiver. Once the digital envelop data becomes known to both sides of a cloud based communication channel, only one of the two WF muxed files either ES(t) or Ed(t) will be sent to cloud.

FIG. 3 features a technique to send a digital data set and an original digital envelope data set to a desired receiver. Both outputs of the pre-processor 130, Es(t) and Ed(t) are sent to the receiver for reconstituting both the embedded data, and the original digital data of the digital envelope.

Embodiment 3

Figure 4:
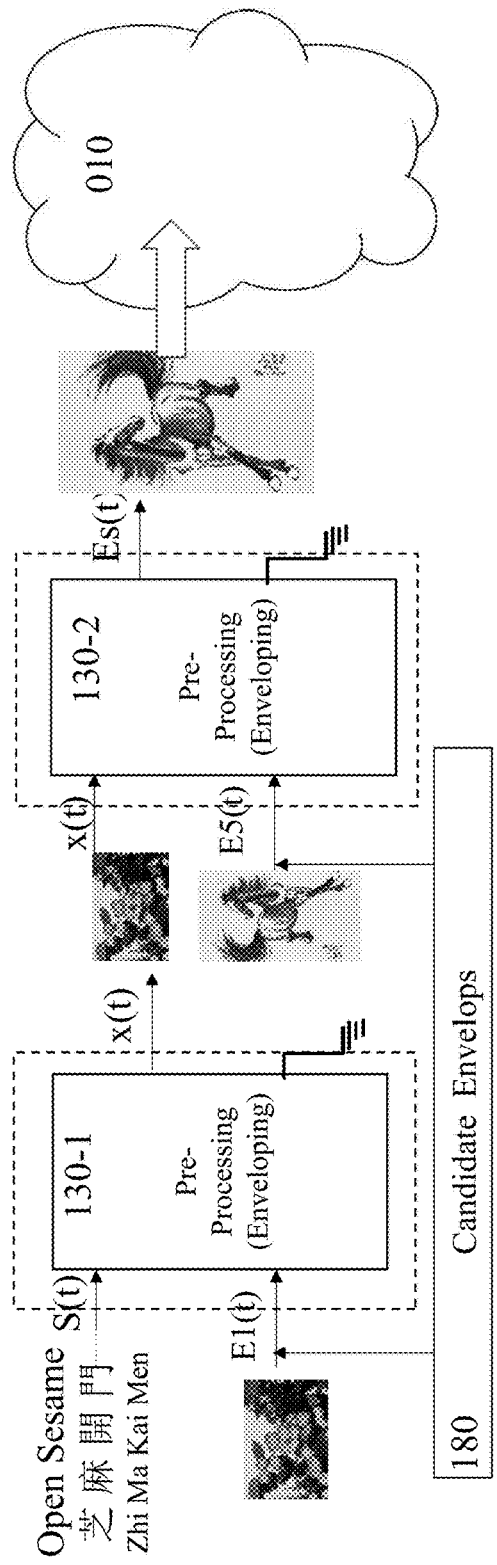
FIG. 4 illustrates a block diagram of double enveloping in accordance to some embodiments of this invention.

FIG. 4 depicts a transmitting (Tx) operation concept of double enveloping using 2-to-2 WF multiplexing for enveloping a message data set via two envelopes sequentially. It depicts first two of the three segments in FIG. 1: (1) a pre-processing or enveloping 130, (2) transported via cloud 010, and (3) post processing or de-enveloping 140.

There are two enveloping processing in series in FIG. 4. Each one is identical to the enveloping shown in FIG. 1. In the first pre-processing 130-1, there are two inputs; S(t) and E1(t), and one output x(t). The second output is grounded. S(t) comprises of a phrase of "Open Sesame" and its Chinese translation, and is the message to be delivered to destinations via cloud. E1(t) is a selected inner envelope and is one of the candidate envelopes 180. The first output x(t) features an appearance substantially identical to human sensors as that in E1(t). The second output is grounded.

In the second preprocessing 130-2, there are also two inputs, x(t) and E5(t), and only one output Es(t). E5(t) is a selected outer envelope and is also one of the candidate envelopes 180. The first output Es(t) features an appearance substantially identical to human sensors as that in E5(t).

There is no appearance of a phrase of "Open Sesame" and its Chinese translation in Es(t). The required bandwidth for transporting the Es(t) shall be near identical to that of sending S(t) via cloud when the enveloping files, E1(t) or E5(t) are properly chosen.

In other embodiments, images in the enveloping files may have been processed for various purposes such as minimized dynamic range of individual pixels or simply for enhanced authentication and identifications before WF muxing. Many can be pre-stored in the envelop candidate files as optional candidates. Certainly, these additional processing can be included as a part of the pre-processing 130 in FIG. 1. It may also be implemented for double enveloping in either 130-1 or 130-2 blocks or both in FIG. 4.

Figure 5:
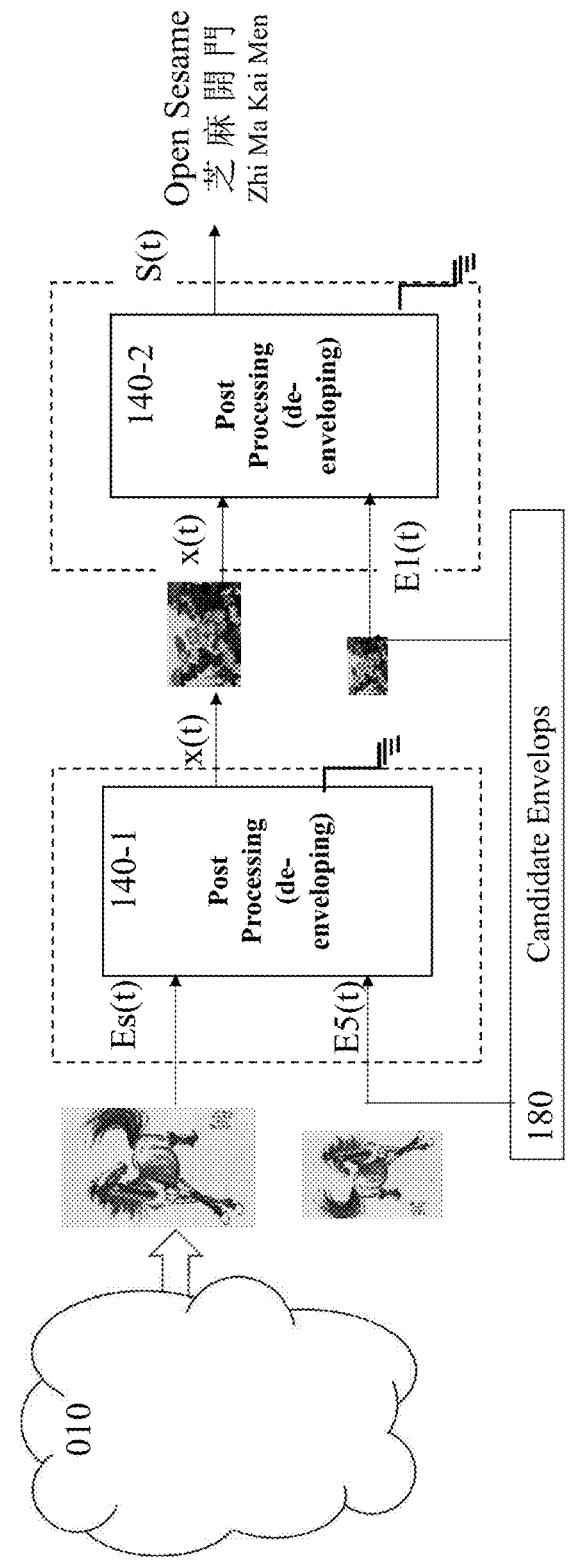
FIG. 5 illustrates block diagram of double de-enveloping in accordance to some embodiments of this invention.

FIG. 5 depicts a receiving (Rx) operation concept of de-enveloping doubly enveloped messages using 2-to-2 WF demultiplexing techniques for de-enveloping a message data set via two envelopes sequentially. It depict the last two of the three segments in FIG. 1; (1) a pre-processing or enveloping 140, (2) transported via cloud 010, and (3) post processing or de-enveloping 140.

There are two de-enveloping processing in series. Each one is identical to the de-enveloping shown in FIG. 1. In the first post-processing 140-1 to open the outer envelope, there are two inputs; Es(t) and E5(t), and one output x(t). The second output is grounded. Es(t) is the received digital data file with embedded message for the receiver in the destination. E5(t) is a selected outer envelope and is one of the candidate envelopes in a candidate file 180 known priori to both the sender and the receiver.

The first input Es(t) is a received data file in a desired receiver at a destination, and shall be substantially equivalent to the only output of the second pre-processing 130-2 in FIG. 4. In addition it shall feature an appearance substantially identical to human sensors as those in E5(t). Similarly, the first output x(t) of the first post processor 140-1 features an appearance substantially identical to human sensors as those in E1(t). The second output is grounded. In the second post-processing 140-2, there are also two inputs, x(t) and E1(t), and only one output S(t). E1(t) is the selected inner envelope and is one of the candidate envelopes in the candidate file 180. The first output is the recovered embedded message which shall read as "open sesame' and its Chinese translation in 4 Chinese characters.

Embodiment 4

Figure 6:
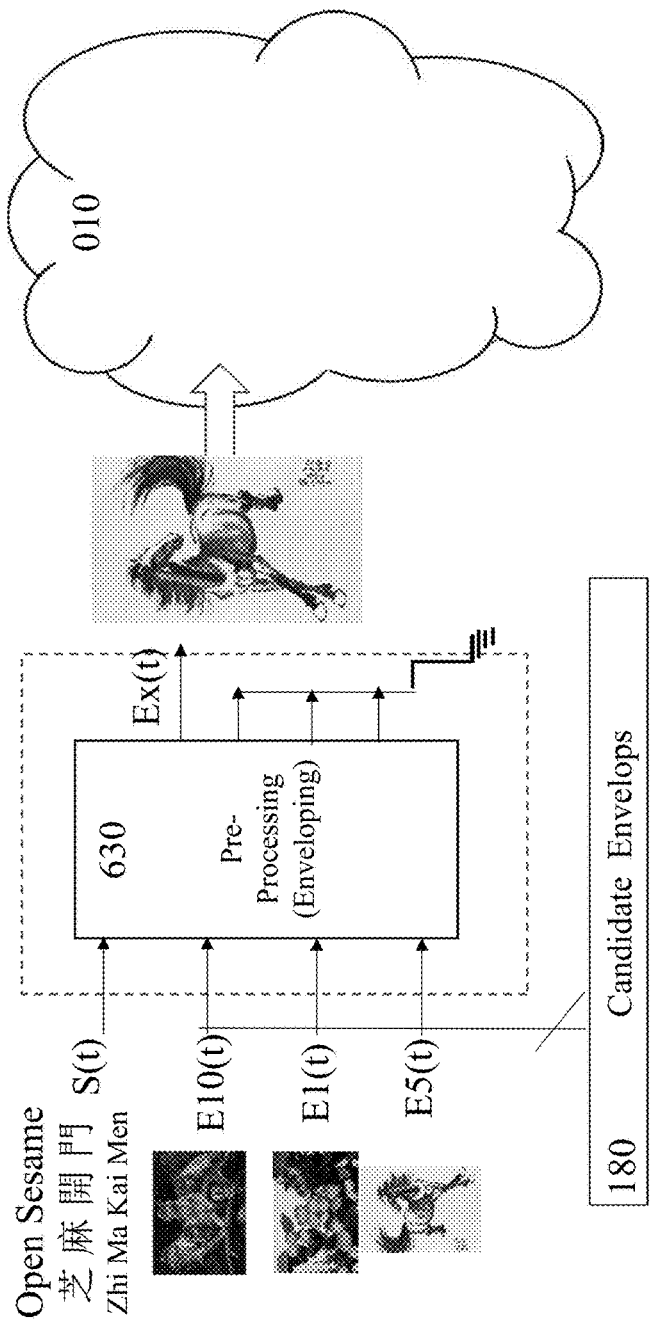
FIG. 6 illustrates a block diagram of enveloping via higher order WF muxing for one enveloped digital stream carrying embedded information data in accordance to some embodiments of this invention.

FIG. 6 depicts a transmitting (Tx) operation concept of enveloping using higher order WF multiplexing techniques for enveloping a message data set. A higher order WF muxing is referred to M-to-M WF muxing; where M is an integer and ≥4. We use a 4-to-4 WF muxing to exemplify operation concepts. The three grouped segments for enveloping and de-enveloping are identical to the ones shown in FIG. 1. It depicts first two of the following three segments: (1) a pre-processing or enveloping 630, (2) transported via cloud 010, and (3) post processing or de-enveloping 640.

A 4-to-4 WF muxing is implemented in the pre-processing 630. There are four inputs connected to S(t), E10(t), E1(t), and E5(t), and only one output used for Ex(t). The remaining three outputs of the WF muxing are grounded. S(t) comprises of a phrase of "Open Sesame" and its Chinese translation by 4 Chinese characters, and is the message to be delivered to destinations via cloud. E5(t) is the selected envelope and is one of the candidate envelopes in the candidate file 180. The first output Ex(t) features an appearance substantially identical to human sensors as those in E5(t). The second and the third inputs E10(t) and E1(t) are also in the file 180 for candidate envelopes known a priori to both the sender and the receiver.

The mathematic derivations are identical to the ones for FIG. 2 when we use a 4-to-4 Hadamard matrix for both the WF muxing and demuxing. The 4-to-4 WF muxing in the preprocessing 630 is formulated based on Equation (7) as;

$$\begin{bmatrix} Ex(t) \\ O2 \\ O3 \\ O4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} am*E5(t) \\ E1(t) \\ E10(t) \\ S(t) \end{bmatrix} \quad (7\text{-}2)$$

The first output O1 is name Ex(t), the other 3 outputs are grounded in FIG. 6. The scaling factor am is set to ~10, so that the Ex(t) appears substantially identical to the appearance of E5(t) to human sensors. Ex(t) is to be delivered to destinations via cloud 010.

Figure 7:
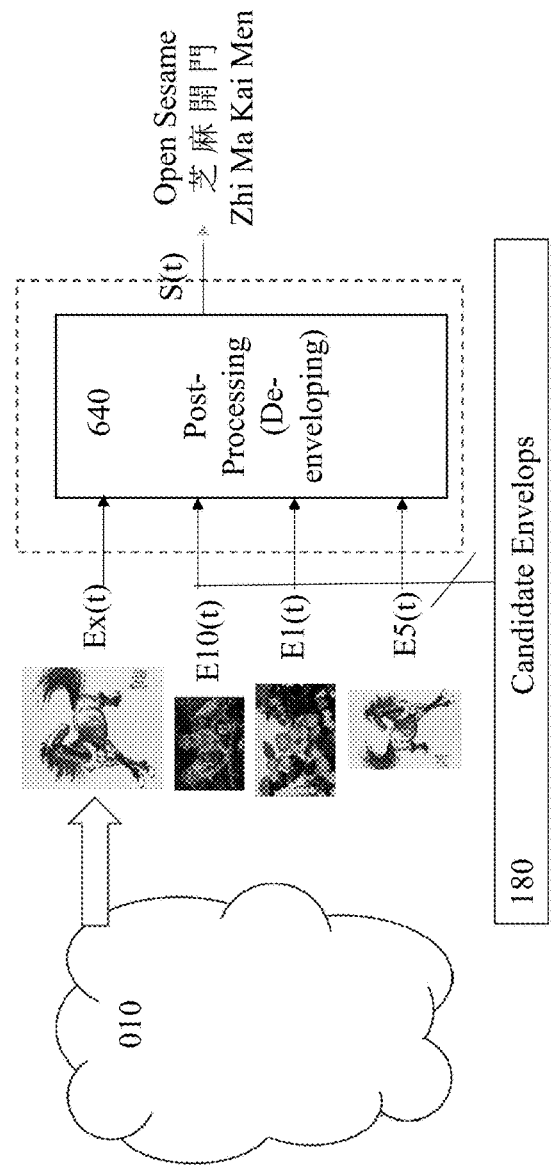
FIG. 7 illustrates a block diagram of de-enveloping via higher order WF de-muxing from one enveloped digital stream carrying embedded information data in accordance to some embodiments of this invention.

FIG. 7 is a block diagram of de-enveloping in a destination; reverse processing of those in FIG. 6. It depicts a receiving (Rx) operation concept of de-enveloping using higher order WF de-multiplexing techniques for de-enveloping a message data set. A higher order WF demuxing is referred to M-to-M WF demuxing; where M is an integer and ≥4. The three segments for enveloping and de-enveloping are identical to the ones shown in FIG. 1; (1) a pre-processing or enveloping 630, (2) transported via cloud 010, and (3) post processing or de-enveloping 640. It depicts last two of the three segments.

Only one of the four WF muxed data set was sent to a destination via cloud 010. The required communication channel bandwidth may be nearly identical to that of S(t) signal itself, when the digital envelope, E5, is properly chosen and further optimized in pre-processing 630 accordingly.

In the post-processing 640 a 4-to-4 WF demuxing is incorporated. There are four inputs; (1) Ex(t) the only received data set, (2) E10(t) a known digital data in the envelop candidate file, (3) E1(t) a second known digital data in the envelop candidate file, and (4) E5(t) a known digital data for the selected digital envelop. Based on Equation (7-2);

$$Ex(t)=am*E5(t)+E1(t)+E10(t)+S(t) \quad (8)$$

and $S(t)=Ex(t)-(am*E5(t)+E1(t)+E10(t)) \quad (8\text{-}1)$

Only one received enveloped file Ex(t) is used in Equation (8-1). The second, the third, and the four inputs of the 4-to-4 WF demuxing are known data sets. The recovered S(t) from the WF demuxing shall be the embedded message delivered and shall comprise of the phrase of "Open Sesame" and its Chinese translation by 4 Chinese characters.

Furthermore according to Equation (7-2), O2, O3, and O4 can now be reconstructed based on the recovered Ex(t). The restructured O2, O3, and O4 may be used for enhanced identifications.

Embodiment 5

Figure 8:
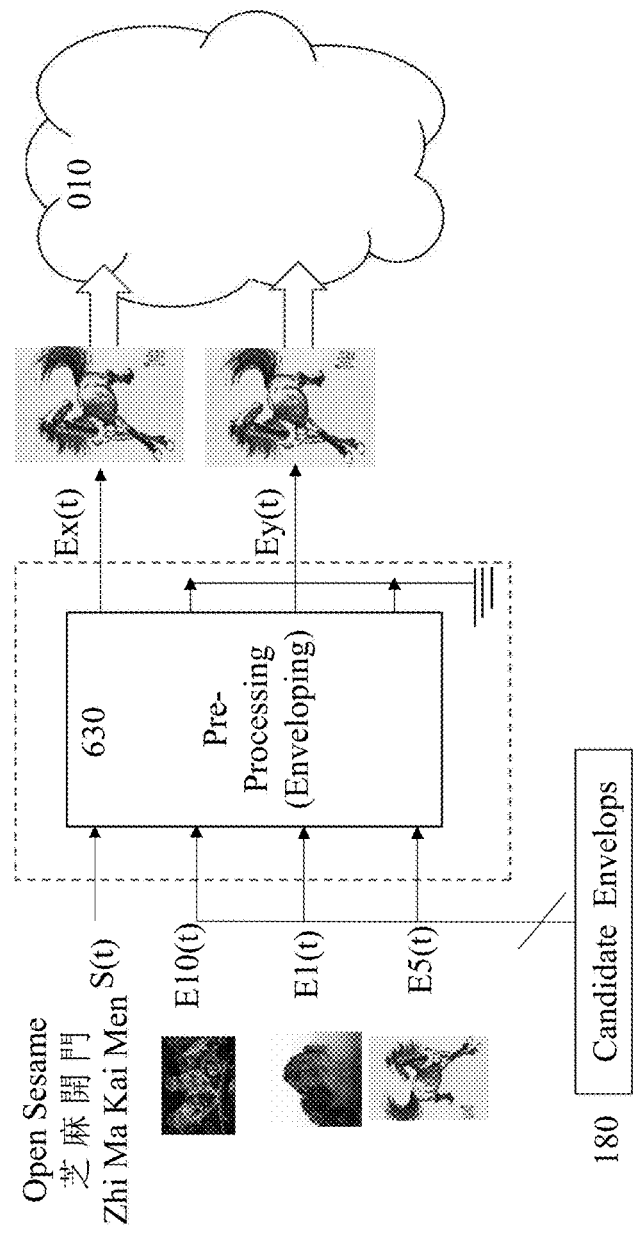
FIG. 8 illustrates a block diagram of enveloping via higher order WF muxing for two enveloped streams carrying embedded information data in accordance to some embodiments of this invention.
Figure 9:
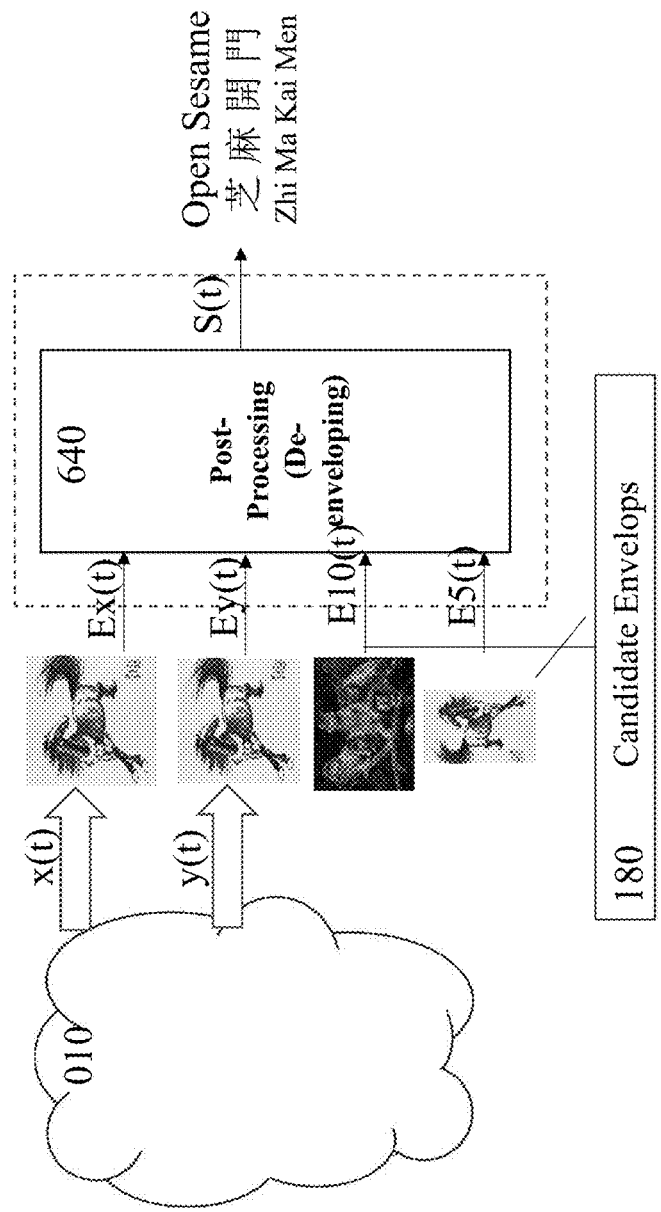
FIG. 9 illustrates a block diagram of de-enveloping via higher order WF de-muxing from two enveloped digital streams in accordance to some embodiments of this invention.

FIG. 8 and FIG. 9 depict the enveloping and de-enveloping using higher order WF muxing and demuxing. Two of the four outputs from a 4-to-4 WF muxing are used as enveloped data sets to be sent to destinations via cloud 010.

FIG. 8 depicts a transmitting (Tx) operation concept of enveloping using higher order WF multiplexing techniques for enveloping a message data set. We use a 4-to-4 WF muxing to exemplify operation concepts. The three grouped segments for enveloping and de-enveloping are identical to the ones shown in FIG. 1. It depicts first two of the following three segments: (1) a pre-processing or enveloping 630, (2) transported via cloud 010, and (3) post processing or de-enveloping 640.

A 4-to-4 WF muxing is implemented in the pre-processing 630. There are four inputs connected to S(t), E10(t), E1(t), and E5(t), and only two outputs used for Ex(t) and Ey(t). The remaining two outputs of the WF muxing are grounded. S(t) comprises of a phrase of "Open Sesame" and its Chinese translation by 4 Chinese characters, and is the message to be delivered to destinations via cloud. E5(t) is the selected envelope and is one of the candidate envelopes in the candidate file 180. As to the first output Ex(t) and the third output Ey(t), each features an appearance substantially identical to human sensors as those in E5(t). The second and the third inputs E10(t) and E1(t) are also in the file 180 for candidate envelopes known a priori to both the sander and the receiver.

The mathematic derivations are identical to the ones for FIG. 2 when we use a 4-to-4 Hadamard matrix for both the WF muxing and demuxing. The 4-to-4 WF muxing in the preprocessing 630 is formulated based on Equation (7) as:

$$\begin{bmatrix} Ex(t) \\ O2 \\ Ey(t) \\ O4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} am*E5(t) \\ E1(t) \\ E10(t) \\ S(t) \end{bmatrix} \quad (7\text{-}3)$$

The first and the third outputs, O1 and O3, are named Ex(t) and Ey(t) respectively. The other 2 outputs are grounded in FIG. 8. The scaling factor am is set to ~10, so that both the Ex(t) and Ey(t) appear substantially identical to the appearance of E5(t) to human sensors. Ex(t) and Ey(t) are to be delivered to destinations via cloud 010.

FIG. 9 is a block diagram of de-enveloping in a destination; reversed processing of those in FIG. 8. It depicts a receiving (Rx) operation concept of de-enveloping using higher order WF de-multiplexing techniques for de-enveloping a message data set.

Only two of the four WF muxed data set are sent to a destination via cloud 010. The required communication channel bandwidth may be about twice as that of S(t) signal itself. Each of the two enveloped files may be as large as that of S(t) itself when the digital envelope, E5, is properly chosen and further optimized in pre-processing 630 accordingly. Additional bandwidth differentials are due to processing overhead.

In the post-processing 640 a 4-to-4 WF demuxing is incorporated. There are four inputs; (1) Ex(t) a first received data set, (2) Ey(t) a second received data set, (3) E10(t) a known digital data in the envelop candidate file 180, and (4) E5(t) a known digital data for the selected digital envelop. Based on Equation (7-3);

$$Ex(t)=am*E5(t)+E1(t)+E10(t)+S(t) \quad (7\text{-}4)$$

$$Ey(t)=am*E5(t)+E1(t)-E10(t)-S(t) \quad (7\text{-}5)$$

and $S(t)=[Ex(t)-Ey(t)]/2-E10(t) \quad (9)$

Two received enveloped files, Ex(t) and Ey(t), are used in Equation (9). The third input for the 4-to-4 WF demuxing is E10(t); a known data set. The fourth input for the 4-to-4 WF demuxing is E5(t); also a known data set. But the formulation in Equation 9 does not need E5(t) in restoring S(t). However, there are 6 different combinations in choosing 2 from 4 WF muxed files as the 2 enveloped carriers. Many of the 6 configurations requires more than one known data sets among E10, E1, and E5 in order to restore S(t).

The recovered S(t) from the WF demuxing shall be the embedded message delivered and shall comprise of the phrase of "Open Sesame" and its Chinese translation by 4 Chinese characters.

Furthermore according to Equation (7-2), O2, and O4 can now be reconstructed based on the recovered S(t) at the destination. The restructured O2, and O4 may be used for enhanced identifications.

Embodiment 6

Figure 10:
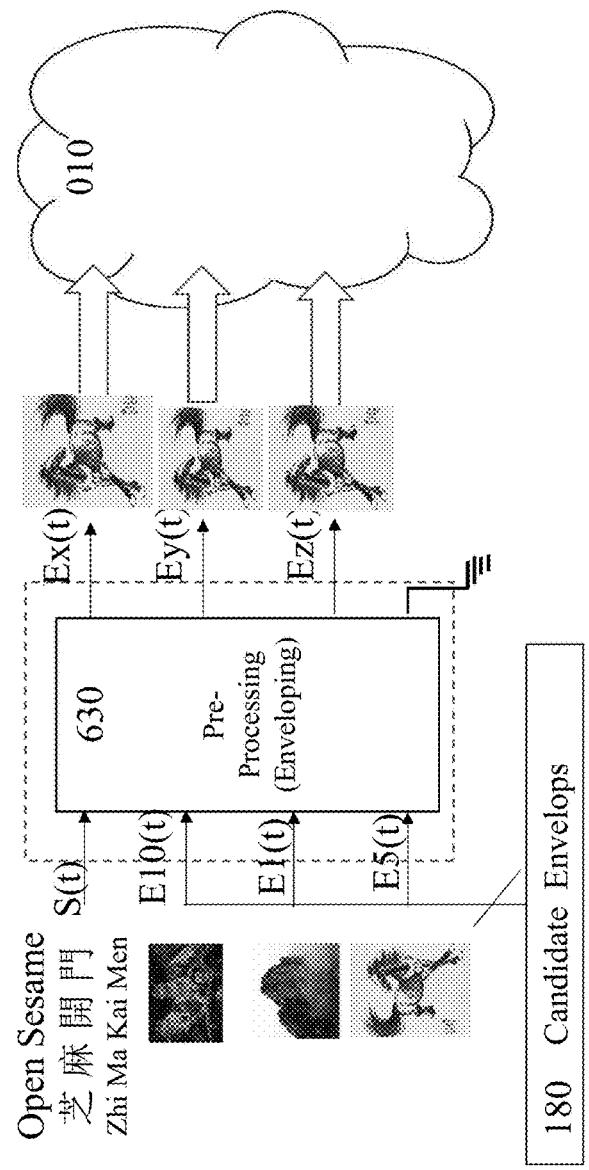
FIG. 10 illustrates a block diagram of enveloping via a 4-to-4 WF muxing for sending three of the 4 available enveloped streams carrying embedded information data via cloud in accordance to some embodiments of this invention.

FIG. 10 depicts a transmitting (Tx) operation concept of enveloping using higher order WF multiplexing techniques for enveloping a message data set. We use a 4-to-4 WF muxing to exemplify operation concepts. Three of the four outputs from a 4-to-4 WF muxing are used as enveloped data sets to be sent to destinations via cloud 010.

A 4-to-4 WF muxing is implemented in the pre-processing 630. The four inputs are connected to S(t), E10(t), E1(t), and E5(t), and only three outputs used for Ex(t), Ey(t) and Ez(t). The remaining one output of the WF muxing is grounded. There are 4 possible configurations to choose 3 out of four outputs. S(t) comprises of a phrase of "Open Sesame" and its Chinese translation by 4 Chinese characters, and is the message to be delivered to destinations via cloud. E5(t) is the selected envelope and is one of the candidate envelopes in the candidate file 180. As to the first output Ex(t), the second output Ey(t), and the third output Ez(t), each features an appearance substantially identical to human sensors as those in E5(t). The second and the third inputs E10(t) and E1(t) are also in the file 180 for candidate envelopes known a priori to both the sender and the receiver. The mathematic derivations are identical to the ones for FIG. 2 when we use a 4-to-4 Hadamard matrix for both the WF muxing and demuxing. The 4-to-4 WF muxing in the preprocessing 630 is formulated based on Equation (7) as:

$$\begin{bmatrix} Ex(t) \\ Ey(t) \\ Ez(t) \\ O4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} am*E5(t) \\ E1(t) \\ E10(t) \\ S(t) \end{bmatrix} \quad (7\text{-}6)$$

The first, second and the third outputs, O1, O2, and O3, are named Ex(t), Ey(t), and Ez(t) respectively. The fourth output is grounded in FIG. 10. The scaling factor am is set to ~10, so that both the Ex(t), Ey(t), and Ez(t) appear substantially identical to the appearance of E5(t) to human sensors. Ex(t), Ey(t), and Ez(t) are to be delivered to destinations via cloud 010.

The required communication channel bandwidth may be about three times as that of S(t) signal itself. Each of the three enveloped files may be as large as that of S(t) itself when the digital envelope, E5, is properly chosen and further optimized in pre-processing 630 accordingly. Additional bandwidth differentials are due to processing overhead.

Figure 11:
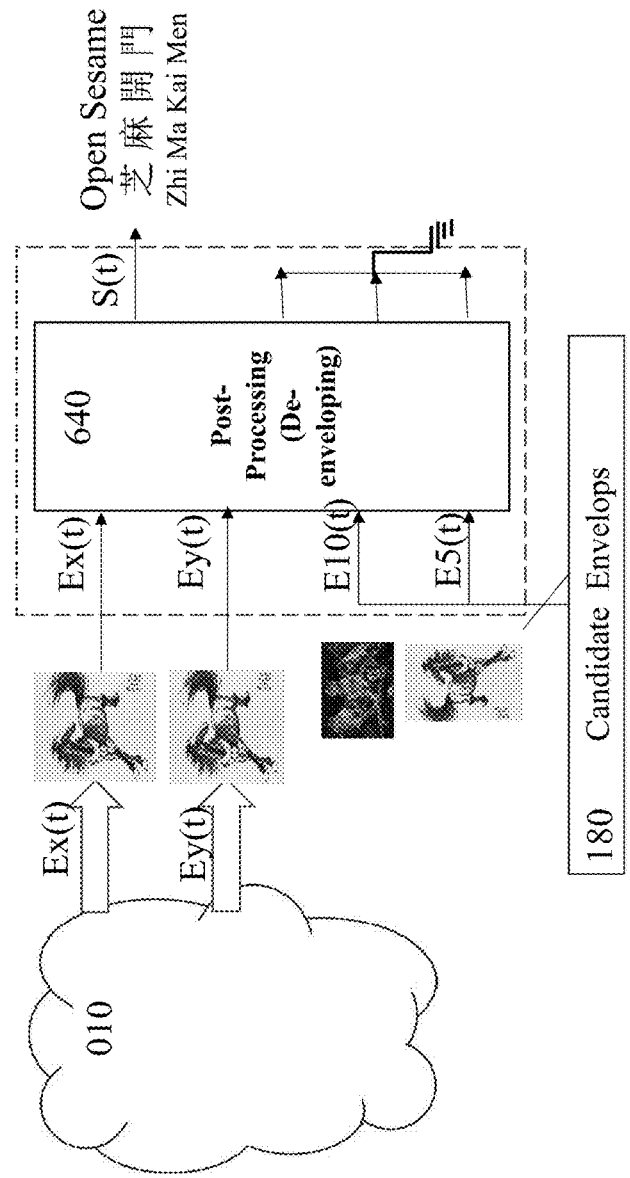
FIG. 11 illustrates a block diagram of de-enveloping via a 4-to-4 WF de-muxing from any two of three enveloped digital streams on cloud in accordance to some embodiments of this invention.

FIG. 11 is a block diagram of de-enveloping in a destination; reversed processing of those in FIG. 10. It depicts a receiving (Rx) operation concept of de-enveloping a message data. Only two of the three WF muxed data sets sent via cloud 010 are received at a desired destination on time. It is assume that Ex(t) and Ey(t) are received at the destination.

In the post-processing 640 a 4-to-4 WF demuxing is incorporated. There are four inputs; (1) Ex(t) a first received data set, (2) Ey(t) a second received data set, (3) E10(t) a known digital data in the envelop candidate file 180, and (4) E5(t) a known digital data for the selected digital envelop. Based on Equation (7-6);

$$Ex(t) = am*E5(t) + E1(t) + E10(t) + S(t) \quad (7\text{-}8)$$

$$Ey(t) = am*E5(t) - E1(t) + E10(t) - S(t) \quad (7\text{-}9)$$

$$Ez(t) = am*E5(t) + E1(t) - E10(t) - S(t) \quad (7\text{-}10)$$

$$\text{and } S(t) = [Ex(t) - Ey(t)]/2 + E1(t) \quad (10)$$

Two received enveloped files, Ex(t) and Ey(t), are used in Equation (10). The third input for the 4-to-4 WF demuxing is E1(t); a known data set. The fourth input for the 4-to-4 WF demuxing is E5(t); also a known data set. But the formulation in Equation (10) does not need E5(t) in restoring S(t).

The recovered S(t) from the WF demuxing shall be the embedded message delivered and shall comprise of the phrase of "Open Sesame" and its Chinese translation by 4 Chinese characters.

Furthermore according to Equation (7-2), O3, and O4 can now be reconstructed based on the recovered S(t) at the destination. The restructured O3, and O4 may be used for enhanced identifications.

Figure 12:
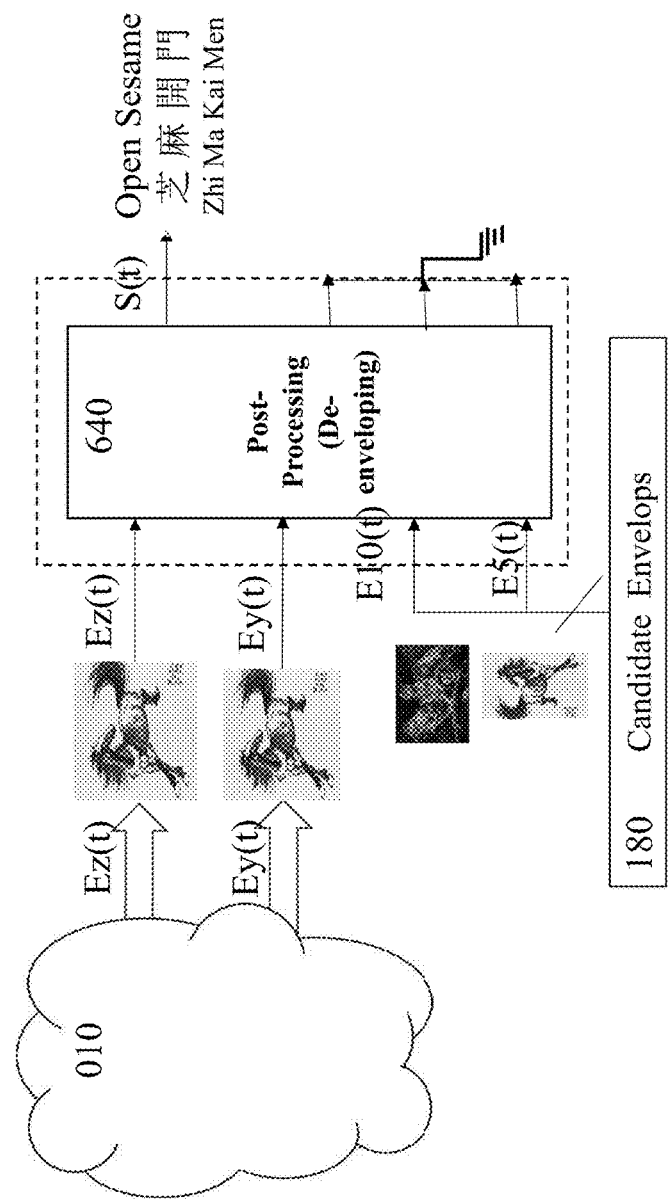
FIG. 12 illustrates another block diagram of de-enveloping via a 4-to-4 WF de-muxing from any two of three enveloped digital streams on cloud in accordance to some embodiments of this invention.

FIG. 12 is a block diagram of de-enveloping in a destination; reversed processing of those in FIG. 10. It depicts a receiving (Rx) operation concept of de-enveloping a message data. Two of the three WF muxed data sets sent via cloud 010 are received at a desired destination on time. Ez(t) and Ey(t) are received at the destination.

In the post-processing 640 a 4-to-4 WF demuxing is incorporated. There are four inputs; (1) Ex(t) a first received data set, (2) Ey(t) a second received data set, (3) E10(t) a known digital data in the envelop candidate file 180, and (4) E5(t) a known digital data for the selected digital envelop. Based on Equation (7-6);

$$Ey(t) = am*E5(t) - E1(t) + E10(t) - S(t) \quad (7\text{-}11)$$

$$Ez(t) = am*E5(t) + E1(t) - E10(t) - S(t) \quad (7\text{-}12)$$

$$\text{and } S(t) = am*E5(t) - [Ey(t) + Ez(t)]/2 \quad (11)$$

Two received enveloped files, Ey(t) and Ez(t), are used in Equation (11). The third input for the 4-to-4 WF demuxing is E1(t); a known data set. The fourth input for the 4-to-4 WF demuxing is E5(t); also a known data set. But the formulation in Equation (11) does not need E1(t) in restoring S(t). The recovered S(t) from the WF demuxing shall be the embedded message delivered and shall comprise of the phrase of "Open Sesame" and its Chinese translation by 4 Chinese characters. Furthermore O1 and O4 can now be reconstructed according to Equation (7-6) based on the recovered S(t) at the destination. The restructured O1 and O4 may be used for enhanced identifications.

Figure 13:
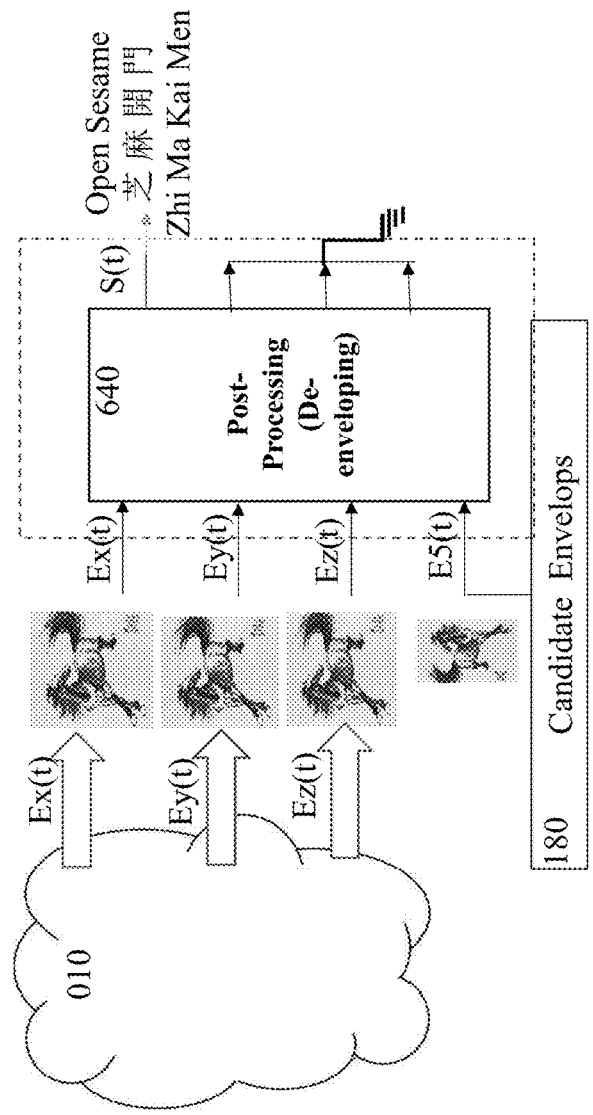
FIG. 13 illustrates a block diagram of de-enveloping via a 4-to-4 WF de-muxing from all three enveloped digital streams on cloud in accordance to some embodiments of this invention.

FIG. 13 is a block diagram of de-enveloping in a destination; reversed processing of those in FIG. 10. It depicts a receiving (Rx) operation concept of de-enveloping a message data, when all three WF muxed data sets sent via cloud 010 are received at a desired destination on time. Ex(t), Ey(t) and Ez(t) are received at the destination on time.

In the post-processing 640 a 4-to-4 WF demuxing is incorporated. There are four inputs; (1) Ex(t) a first received data set, (2) Ey(t) a second received data set, (3) E1(t) a known digital data in the envelop candidate file 180, and (4) Ez(t) a third received data set.

Based on Equation (7-6);

$$Ex(t)=am*E5(t)+E1(t)+E10(t)+S(t) \qquad (7\text{-}13)$$

$$Ey(t)=am*E5(t)-E1(t)+E10(t)-S(t) \qquad (7\text{-}14)$$

$$Ez(t)=am*E5(t)+E1(t)-E10(t)-S(t) \qquad (7\text{-}15)$$

$$\text{and } S(t)=am*E5(t)-[Ey(t)+Ez(t)]/2 \qquad (12\text{-}1)$$

$$\text{or } S(t)=[Ex(t)-Ey(t)]/2-E1(t) \qquad (12\text{-}2)$$

$$\text{or } S(t)=[Ex(t)-Ez(t)]/2-E10(t) \qquad (12\text{-}3)$$

Two of the three received enveloped files, Ex(t), Ey(t) and Ez(t), are used in Equation (12). There are three options to restore the embedded mail, S(t); as delineated in Equations (12-1), (12-2), and (12-3), respectively. They all need a third input for the 4-to-4 WF demuxing. The required $3^{rd}$ file for a restoration processing according to Equation (12-1) is the digital file of the original digital envelope E5(t). Similarly the $3^{rd}$ files for those according to Equation (12-2) and (12-3) are the digital file of E1(t) and that of E10(t), respectively.

With the flexibility in all 3 techniques in Equations (12), a receiver may pick any first two of three possible arrivals, Ex(t), Ey (t) and Ez(t), in restoring the S(t). For delivering music or video clips, these techniques at a destination feature redundancies for better survivability, and enhanced streaming speed of S(t) using only first two arrivals and discarding the last (the third) arrival among the three WF muxed files sent by a source.

In different embodiments for various applications, multiple restoration means described above may be used to differentiating service preferences in a multicasting, or broadcasting modes. For those without accessing to E1 and E10; their services can be completely denied by sending Ey and Ez only via cloud 010. Similarly, controlling delivery of Ex(t) to a slower rate via cloud 010 in streaming a video clip, there will only be ⅓ probability at a normal rate to restore S(t) by using first two arrivals out of three total arrivals in a receiver at destinations. The corresponding overall flow rate may be degraded by ⅔ in receivers to a flow rate at 33% of a normal flow, when Ex(t) delivery are delayed significantly.

Figure 14:
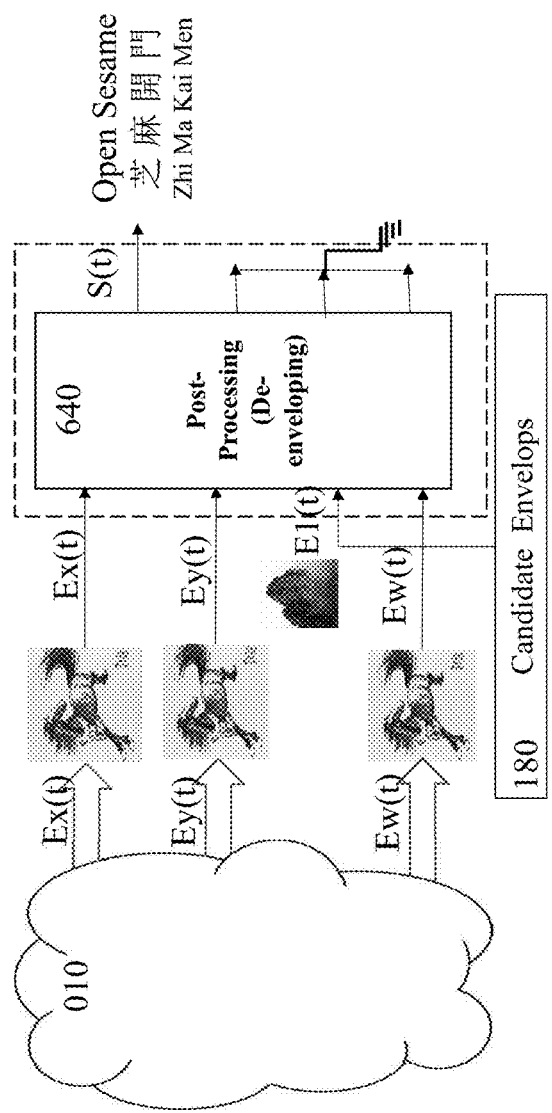
FIG. 14 illustrates another block diagram of de-enveloping via a 4-to-4 WF de-muxing from all three enveloped digital streams on cloud in accordance to some embodiments of this invention.

FIG. 14 is a block diagram of de-enveloping in a destination; reversed processing of those in FIG. 10. It is for a scenario that the 3 selected WF muxed data sets to be sent via cloud 010 are Ex(t), Ey(t), and Ew(t). It depicts a receiving (Rx) operation concept of de-enveloping a message data, when all three WF muxed data sets sent via cloud 010 are received at a desired destination on time. Ex(t), Ey(t) and Ew(t) are received at the destination on time.

In the post-processing 640 a 4-to-4 WF demuxing is incorporated. There are four inputs; (1) Ex(t) a first received data set, (2) Ey(t) a second received data set, (3) E1(t) a known digital data in the envelop candidate file 180, and (4) Ez(t) a third received data set.

Based on Equation (7-6);

$$Ex(t)=am*E5(t)+E1(t)+E10(t)+S(t) \qquad (7\text{-}16)$$

$$Ey(t)=am*E5(t)-E1(t)+E10(t)-S(t) \qquad (7\text{-}17)$$

$$Ew(t)=am*E5(t)-E1(t)-E10(t)+S(t) \qquad (7\text{-}18)$$

$$\text{and } S(t)=E10(t)+[Ey(t)-Ew(t)]/2 \qquad (12\text{-}4)$$

$$\text{or } S(t)=[Ex(t)-Ey(t)]/2-E1(t) \qquad (12\text{-}5)$$

$$\text{or } S(t)=[Ex(t)+Ew(t)]/2-am\ E5(t) \qquad (12\text{-}6)$$

Two of the three received enveloped files, Ex(t), Ey(t) and Ew(t), are used in Equation (12). There are three options to restore the embedded mail, S(t); as delineated in Equations (12-4), (12-5), and (12-6), respectively. They all need a third input for the 4-to-4 WF demuxing; similar to the block diagram in FIG. 13. The required $3^{rd}$ file for a restoration processing according to Equation (12-4) is the digital file of the original digital file E10(t). Similarly the $3^{rd}$ files for those according to Equation (12-5) and (12-6) are the digital file of E (t) and that of E5(t), respectively.

With the flexibility in all 3 techniques in Equations (12), a receiver may pick any first two of three possible arrivals, Ex(t), Ey (t) and Ew(t), in restoring the S(t). For delivering music or video clips, these techniques at a destination feature redundancies for better survivability, and enhanced streaming speed of S(t) using only first two arrivals and discarding the last (the third) arrival among the three WF muxed files sent by a source.

Embodiment 7

Figure 15:
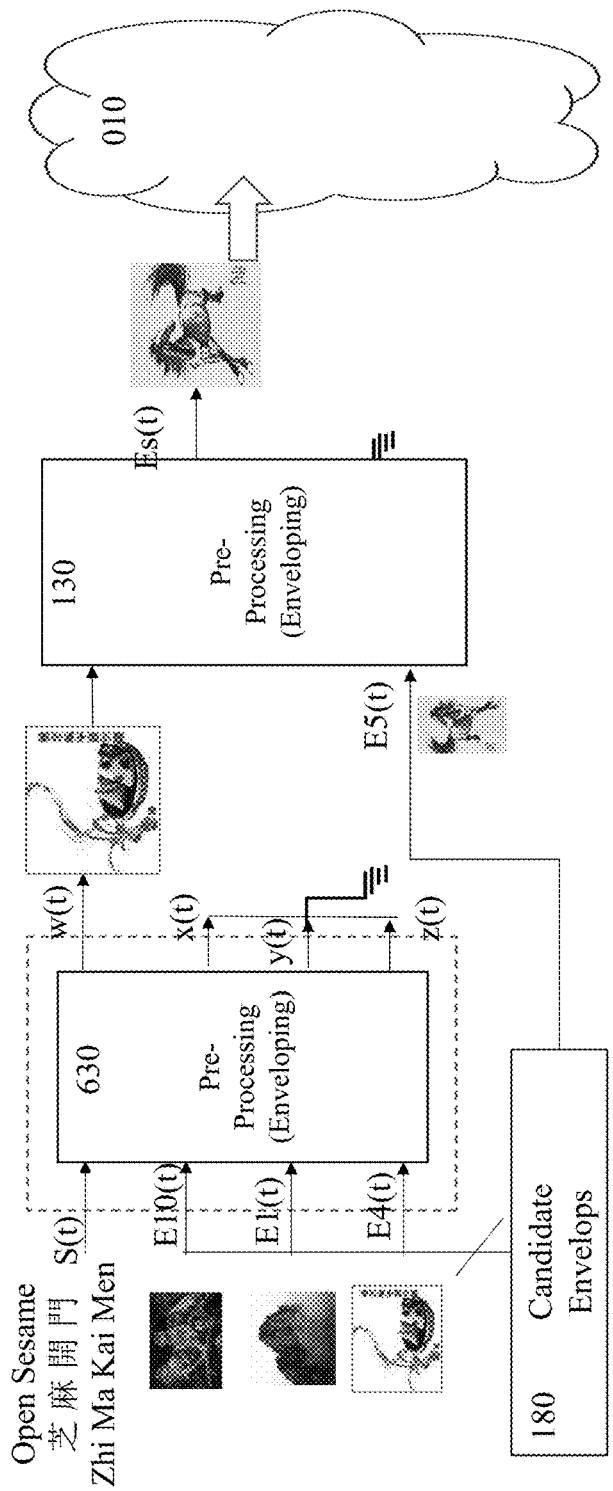
FIG. 15 illustrates a block diagram of double enveloping via a 4-to-4 WF muxing and a 2-to-2 WF muxing to form one enveloped digital streams on cloud in accordance to some embodiments of this invention.

FIG. 15 depict a Tx operation concept of double enveloping using WF multiplexing for enveloping a message data set via two envelopes sequentially. It depicts first two of the three segments in FIG. 1: (1) a pre-processing or enveloping 130, (2) transported via cloud 010, and (3) post processing or de-enveloping 140.

There are two enveloping processing in series in FIG. 15. The inner enveloping and the outer enveloping are, respectively, identical to the enveloping shown in FIG. 6 and that in FIG. 1. In the first pre-processing 630, there are four inputs connected to 4 digital data files, S(t), E10(t), E1(t), and E4(t), and a first of the 4 outputs is assigned as output w(t). The other 3 outputs, x(t), y(t), and z(t), are grounded. S(t) comprises of a phrase of "Open Sesame" and its Chinese translation, and is the message to be delivered to destinations via cloud. E4(t) is a selected inner envelope and is one of the candidate envelopes in the candidate file 180. The first output w(t) features an appearance substantially identical to human sensors as that in E4(t).

In the second preprocessing 130, there are two inputs, w(t) and E5(t), and a first output assigned as output Es(t). The second output is grounded. E5(t) is a selected outer envelope and is also one of the candidate envelopes in the candidate file 180. The first output Es(t) features an appearance substantially identical to human sensors as that in E5(t).

Only one WF muxed file, Es(t) is sent to destinations via cloud 010. There is no phrase of "Open Sesame" or its Chinese translation on the appearance of Es(t). The required bandwidth for transporting the Es(t) shall be near identical to that of sending S(t) via cloud when the enveloping files, E4(t) or E5(t) are properly chosen.

In other embodiments, images in the enveloping files may have been processed for various purposes such as minimized dynamic range of individual pixels or simply for enhanced authentication and identifications before WF muxing. Many can be pre-stored in the envelop candidate files as optional candidates. Certainly, these additional processing can be included as a part of the first pre-processing 630 and/or the second 130.

Figure 16:
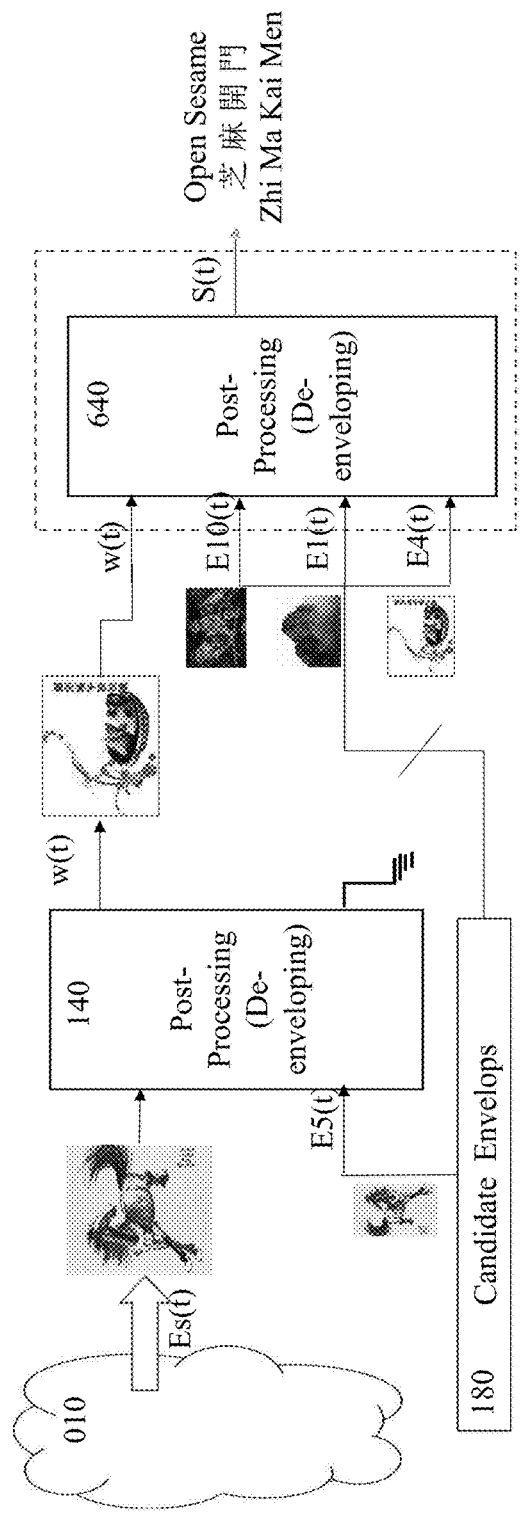
FIG. 16 illustrates a block diagram of double de-enveloping via a 2-to-2 WF de-muxing and a 4-to-4 WF demuxing from one enveloped digital streams on cloud in accordance to some embodiments of this invention.

FIG. 16 depicts a receiving (Rx) operation concept of de-enveloping doubly enveloped messages using WF demultiplexing techniques. There are two de-enveloping processing in series. A first post-processing 140 to open the outer envelope is identical to the de-enveloping shown in FIG. 1. There are two inputs connected to Es(t) and E5(t). Es(t) is the received digital data file with embedded message for a desired receiver in the destination. and shall be substantially equivalent to the only output of the second pre-processing 130 in FIG. 15. In addition it shall feature an appearance substantially identical to human sensors as those in E5(t). E5(t) is a selected outer envelope and is one of the candidate envelopes in a candidate file 180 known priori to both the sender and the receiver.

Similarly, there are two outputs from the post processor 140. The first output w(t) of the first post processor 140 features an appearance substantially identical to human sensors as those in E4(t). The second output is grounded.

In the second post-processing 640, there are four inputs, connected to w(t), E10(t), E1(t), and E4(t). E4(t) is the selected inner envelope and is one of the candidate envelopes in the candidate file 180. E10(t) and E1(t) are digital files in the candidate file 180. There are two outputs, and the first one is assigned as output S(t) and a second one is grounded. The first output is the recovered embedded message.

It is conceivable to extend the double enveloping/de-enveloping depicted in FIG. 15 and FIG. 16 to multiple layers of enveloping and de-enveloping by cascading more M-to-M WF muxing processors in preprocessing in a source and more M-to-M WF demuxing processors in post processing in a receiver, where M≥2 and is an integer.

Embodiment 8

Enveloping and de-enveloping can be used as tools for digital right managements (DRM). We may use FIG. 1 to illustrate an architecture for DRM applying to release of a new movie. The original movie is in a mother version. We will use the enveloping technique to embed various distinguishable and unique features on different daughter movie copies. As a result of the enveloping technique depicted in FIG. 1, FIG. 4, or FIG. 6, every daughter copy of the new movie will have substantially identical appearances and identical functions as those in the original mother movie version.

When a pirate version is discovered, no mattered whether it was produced through a leak in a corrupted distribution channel, or through a new recording from a hidden video recorder in a commercial theater, we will reconstitute the embedded unique features on a copy; only with the original digital file of mother movie version through a corresponding de-enveloping processor in FIG. 1, FIG. 5, or FIG. 7, respectively. The unique embedded features will lead to the identification of which daughter copy that the pirate version was originated from.

For the preprocessing 130 in FIG. 1, E5(t) will represent a mother version of an original movie, and S(t) will be features and identifiers of a daughter copy. A 2-to-2 WF muxing in the preprocessing 130 will be configured to have E5(t) significantly emphasized so that a first output of the WF muxing device Es(t) featuring a daughter version of movie copy with an video and audio appearances substantially identical to those in the E5(t); the mother version of the movie.

The original mother movie versions will not be distributed at all. They may be stored in libraries or cloud storages. The daughter movies are distributed for public release, featuring substantially identical picture quality to that of the mother movie version. However each daughter movie copy is uniquely embedded by an enveloping process with uniquely identifiable features. The mother movie serve as the function of the digital envelope only. The embedded messages or unique features are part of the daughter copy, not in form a watermark or invisible watermark.

In fact a daughter movie comprises a WF multiplexed file of an M-to-M wavefront multiplexing processor where M≥2. In the M-to-M WF muxing, there generated M equations. A selected daughter movie corresponds to only one of the M equations. For anyone associated distributions of the selected daughter movie copy to alter the embedded identifiers, he or she must have access to the other M−1 WF muxed files or equivalently unique M−1 inputs of the M-to-M WF muxing. These inputs may be for additional probing, more privacy, and enhanced authentications. For M=2, the enveloping process is shown in FIG. 1.

When pirate copies of daughter movies are captured in market or intercepted in a distribution network, their origins can be identified by reconstituting the embedded identifier file through a WF demuxing processing. The inputs to the WF demuxing comprising at least two files; a first one is the captured pirate copy of movie, and a second one is the original mother movie.

We have used movies in the DRM example. The same principle of enveloping/de-enveloping techniques for sounds or other audio IPs delivered via cloud or other public distribution networks.

Figure 17A:
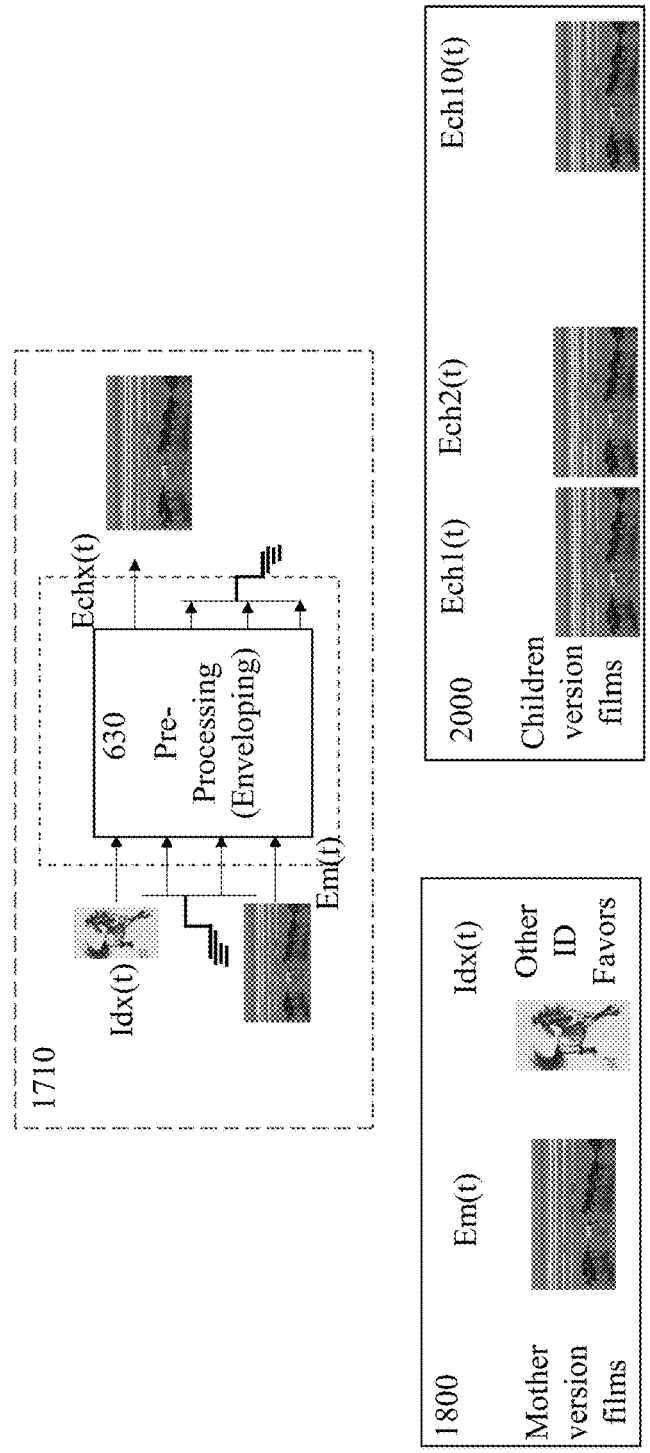
FIG. 17A illustrates a block diagram of enveloping for digital right management (DRM) applications by embedding identifiers of a child edition digital document/movie picture and then storing the document/movie pictures on cloud or having it distributed in accordance to some embodiments of this invention.

We may use FIG. 17A to illustrate another architecture for DRM applying to releases and distributions of a new movie. The original movie is in a mother version. We will use the enveloping technique to embed various distinguishable and unique features on different daughter version movie copies. As a result of the enveloping technique depicted in FIG. 1, FIG. 4, FIG. 6, or other similar versions, every daughter copy of the new movie will have substantially identical appearances and identical audio and video functions as those in the original mother movie version. We choose the preprocessor 630 in FIG. 6 as the enveloping processor here.

Figure 17B:
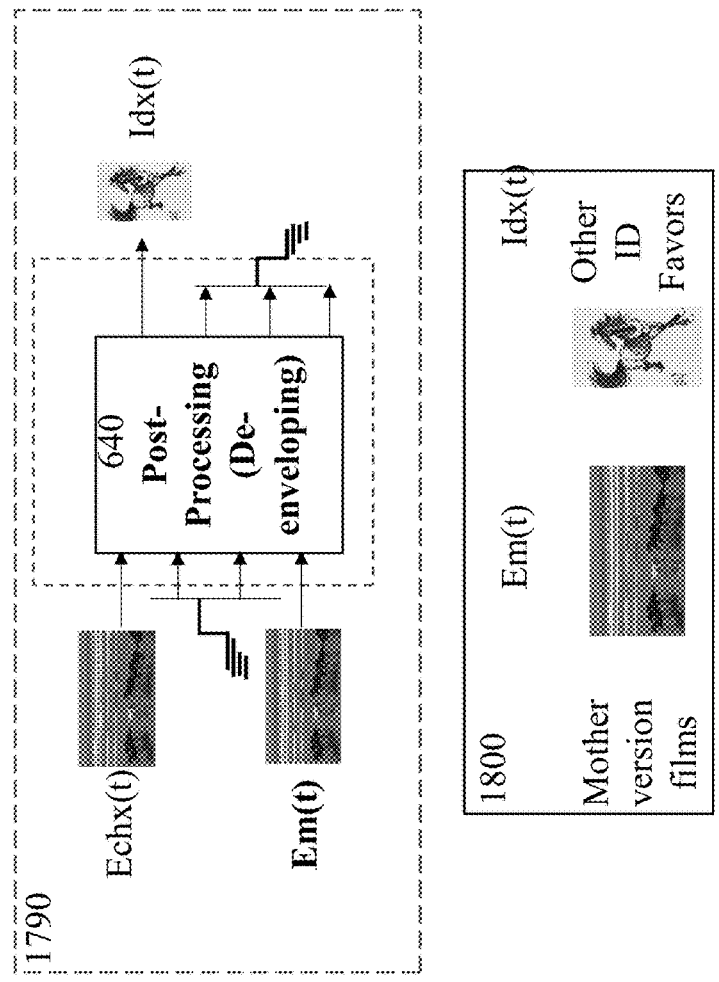
FIG. 17B illustrates a block diagram of de-enveloping digital documents or stored movie pictures on cloud to recover embedded identifiers in accordance to some embodiments of this invention.

When a pirate version is discovered, no mattered whether it was produced through a leak in a corrupted distribution channel, or through a new recording from a hidden video recorder in commercial movie theaters, we will reconstitute the embedded unique features on a copy; only with the original digital file of mother movie version through a corresponding de-enveloping processor in FIG. 17B. The unique embedded features will lead to the identification of which child copy that the pirate version was originated from.

For the preprocessing 630 in FIG. 17A, Em(t) represents a mother version of an original movie, and Idx(t) features identifiers of a child copy. A 4-to-4 WF muxing in the preprocessing 630 is configured to have Em(t) significantly emphasized so that a first output of the WF muxing device Echx(t) featuring a child version of movie copy with an video and audio appearances substantially identical to those in the Em(t); the mother version of the movie. The remaining two inputs and the three outputs are grounded.

The original mother movie versions of Em(t) will not be distributed at all. They may be stored in libraries or cloud storages. The child version movies are distributed for public release, featuring substantially identical picture quality to that of the mother movie version. However each child version movie copy is uniquely embedded by an enveloping process 1710 with uniquely identifiable features. The mother movie serve as the function of the digital envelope only. The embedded messages or unique features are part of the daughter copy, not in form a watermark or invisible watermark.

In general a daughter (or child) version movie comprises a WF multiplexed file of an M-to-M wavefront multiplexing processor where M≥2. In the M-to-M WF muxing, there generated M equations. A selected child version movie corresponds to only one of the M equations. For anyone associated distributions of the selected child version movie copy to alter the embedded identifiers, he or she must have access to the other M−1 WF muxed files or equivalently unique M−1 inputs of the M-to-M WF muxing. These inputs may be for additional probing, more privacy, and enhanced authentications. An enveloping process for M=2 is shown in FIG. 1. Another different enveloping process for M=4 is shown in FIG. 17A. The entire enveloping processing 1710 are setup to have only one output, Exhx(t), for an "x" daughter version copy. Mother version films, including Em(t), and other identity features, Idx(t) of the "x" daughter copy are stored in a library 1800 locally or distributed on cloud. Various children versions of copied films, Ech1(t), Ech2(t), and etc, are sent to various distributors via a global distribution channel 2000.

When pirate copies of child version movies are captured in market or intercepted in a distribution network, their origins can be identified by reconstituting the embedded identifier file through a WF demuxing processing shown in FIG. 17B. In the de-enveloping processing 1790, inputs to the 4-to-4 WF demuxing 640 comprising at least two files; a first one is the captured pirate copy of movie Echx(t), and a second one is the original mother movie Em(t).

For multilayer distributions, similar concepts can be extended for grand-children versions of movie publications. Every layer of movie distributers will have their tools to trace "leakages" in their respective distribution networks.

In other embodiments, the other two grounded inputs to the preprocessor or the enveloping processor 630 may be used for additional functions of authentications or additional privacy.

We have used movies in the DRM example. The same principle of enveloping/de-enveloping techniques for sounds or other audio IPs delivered via cloud or other public distribution networks.

Embodiment 9

Enveloping and de-enveloping can be used as tools for delivering additional embedded information during re-broadcasting to subscribers. We may use FIG. 17A again to illustrate an architecture for broadcasting additional new information during a re-broadcasting sessions. The original broadcasting Em(t), as an example, is a 30 minute national news in a mother version. We will use the enveloping technique to embed a second independent feature of special reporting Idx(t) on a child version news broadcasting copy. As a result of the enveloping processing 630 depicted in FIG. 17A, the child copy of the news broadcasting Echx(t) appearing at one of its outputs will have substantially identical appearances and identical functions as those in the original mother news broadcasting version Em(t).

At a subscriber receiver, the embedded unique feature of special reporting Idx(t) will be reconstituted and recovered through a corresponding de-enveloping processor 640 in FIG. 17B only with the original mother version broadcasted digital file Em(t). The embedded unique feature of special reporting Idx(t) will become available to the subscribers in addition to the rebroadcasted news Echx(t).

For the preprocessing 630 in FIG. 17A, Em(t) represents a mother version of an original news broadcasting, and Idx(t) features the short feature of special reporting. A 4-to-4 WF muxing in the preprocessing 630 is configured to have Em(t) significantly emphasized so that a first output of the WF muxing device 630 Echx(t) featuring a child version copy of broadcasting news with an video and audio appearances substantially identical to those in the Em(t); the mother version of the broadcasting news. The remaining two inputs and the three outputs from the preprocessing 630 are grounded.

The original mother versions of news Em(t) and the child version copy of the news Echx(t) will be broadcasted or distributed through various channels, at different time slots, or combinations of both. The child version news broadcasting Exhx(t) shall feature substantially identical picture and voice quality to those of the mother version broadcasting news Em(t).

Furthermore each child version copy in a different embodiment may feature uniquely embedded short but different reporting. The mother version serve as the function of the common digital envelope only. The embedded messages or unique features are part of the child copy versions.

For multilayer distributions, similar concepts can be extended for grand-children versions of broadcasting.

In other embodiments, the other two grounded inputs to the preprocessor or the enveloping processor 630 may be used for additional functions of authentications or additional privacy.

We have used news broadcasting in the example. The same principle of enveloping/de-enveloping techniques are applicable for other IPs delivered via cloud or other distribution networks.

Embodiment 10

Figure 18A:
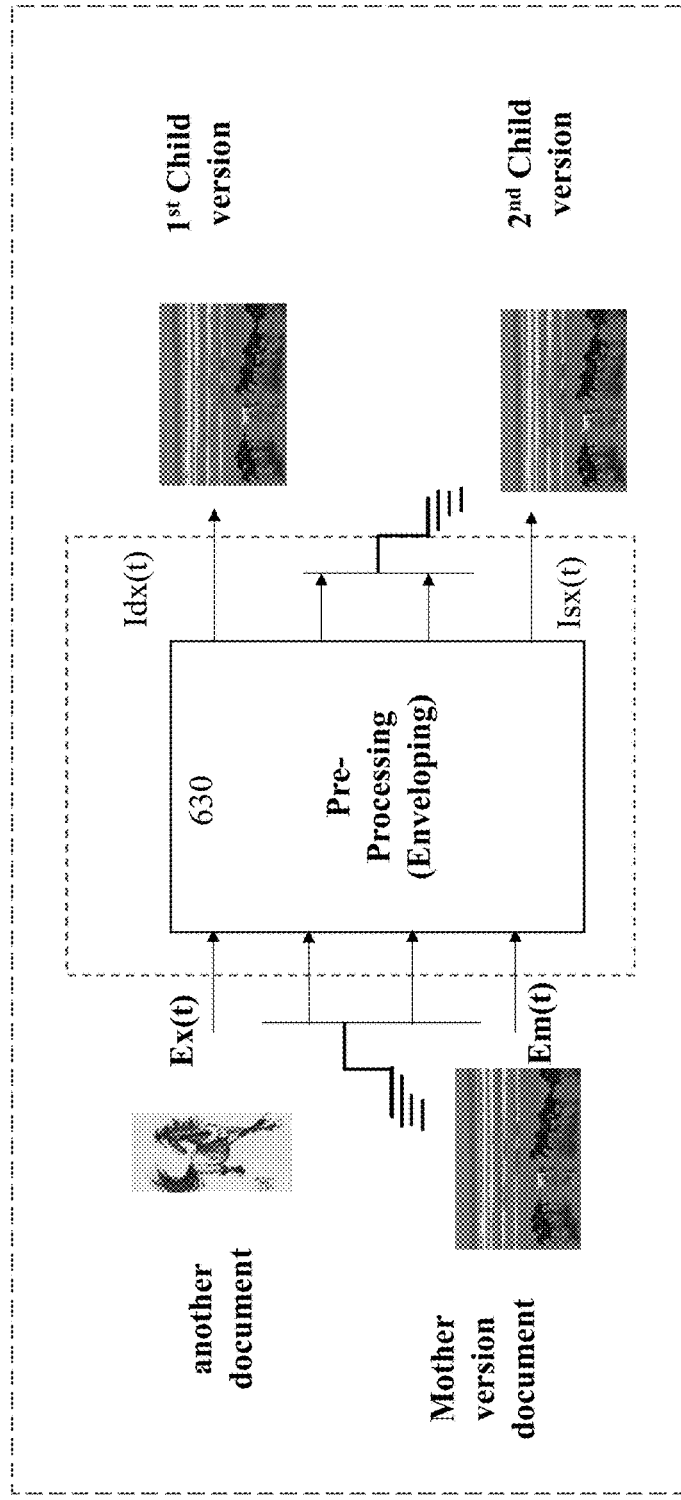
FIG. 18A illustrates a block diagram of enveloping for broadcasting/re-broadcasting applications by embedding additional information in two child edition digital documents and then storing the documents on cloud or having them separately distributed in accordance to some embodiments of this invention.

Enveloping and de-enveloping can be used as tools for delivering additional embedded information during re-broadcasting to subscribers. FIG. 18A illustrates an architecture for broadcasting additional new information during a broadcasting and a re-broadcasting sessions. As an example, the original version of a 30 minute national news Em(t) in a mother version is modified before broadcasting. We will use the enveloping technique to embed a second independent feature of special reporting Ec(t) on two child versions of news broadcasting copies Idx(t) and Isx(t), where Isx(t) =M*Em(t)+Ec(t) and Idx(t)=M*Em(t)−Ec(t), and where M is a magnification factor and shall be greater or equal to 1. As a result of the enveloping processing with a 4-to-4 WF muxing 630 depicted in FIG. 18A, the two child copies of the news broadcasting, Isx(t) and Idx(t), will have substantially identical appearances and identical functions as those in the original mother news version Em(t) for broadcasting. The first broadcasting session will deliver one of the two child copies, say Isx(t), while the re-broadcasting session will deliver the other remaining one copy Idx(t). The 4-to-4 WF muxing 630 may be implemented by a 4-to-4 orthogonal matrix such as a Fourier transform or Hadamard matrix, or a full rank non-orthogonal matrix.

Figure 18B:
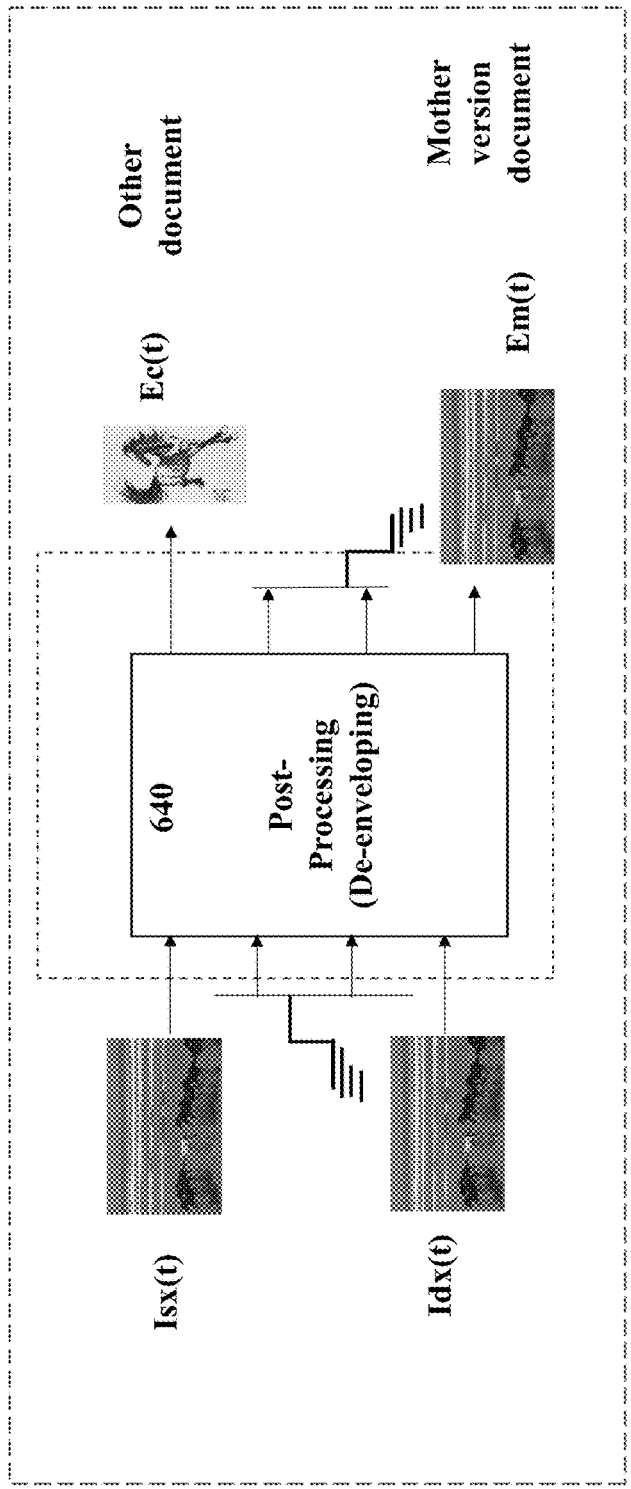
FIG. 18B illustrates a block diagram of de-enveloping from two digital documents to recover embedded additional delivered information in accordance to some embodiments of this invention.

At a subscriber receiver, the embedded unique feature of special reporting will be reconstituted and recovered through a corresponding de-enveloping processor 640 in FIG. 18B only when both the first version broadcasted digital file, Isx(t), and the second version broadcasted digital file, Idx(t) are available. Isx(t) shall be recorded or buffered properly in the receiver. The embedded unique feature of special reporting Ec(t) will become available to the subscribers in addition to the rebroadcasted news in a form of Idx(t).

Many of the cable services and TV satellite providers are delivering same programs concurrently or nearly concurrently through multiple channels. On the other hand, many broadcasting platforms deliver identical program multiple times via the same or different channels. These repeated information delivery opportunities may be utilized for delivering additional information or extended digital documents via digital enveloping techniques.

The enveloping techniques for broadcasting may be extended to two way communications as well. Furthermore, they may also be utilized to deliver a set of new data via multiple broadcasting sessions. The enveloping mechanisms may be configured to have redundancy features, enabling recovering embedded message or data stream, say, when 3 out of 4 re-broadcasting sessions of a same program are available.

It is conceivable to deliver a new data set through multiple repeated broadcasting program. As far as the regular subscribers are concerns, they may see the same repeated programs many times. For other subscriber groups with enveloping and de-enveloping capability, the additional channel capacity that the existing service providers have already had can also be utilized for delivering new additional data, documents and information. The additional channel capacity by enveloping techniques may be used to deliver more paid TV programs, stock exchange real time information, traffic condition broadcasting; and so on.

Embodiment 11

Privacy protections on personnel information or data stored on cloud become important issues lately. Enveloping and de-enveloping are techniques for enhanced privacy protections on stored data on cloud including digital personal photos. The stored personnel information is for the convenience of a user, and is not for sharing it with other users. For instance, the stored enveloped data may be processed by a PC on a desk in the user office. The retrieved data may be reconstituted from the user cell phone in a different city at a later time. Similar data storage and retrieving concepts may implemented on other personal devices; e.g. tablets such as iPads, window Surfaces, Galaxy Notes, and etc.

Figure 19:
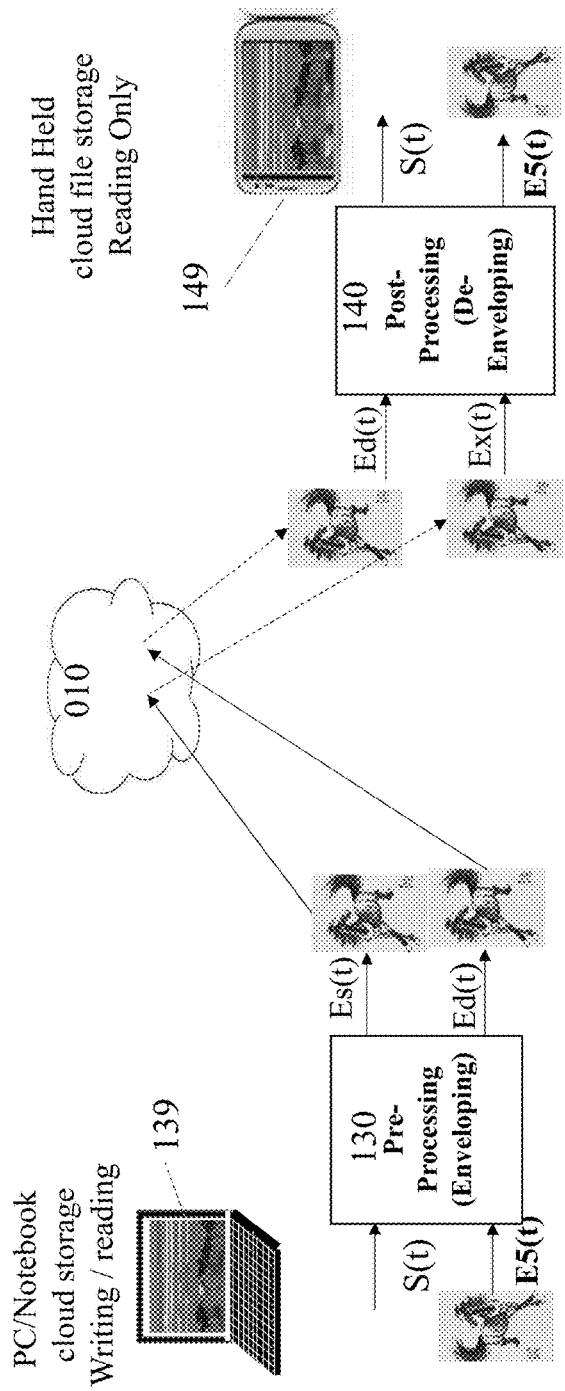
FIG. 19 illustrates a block diagram of storing WF muxed data on cloud and retrieving information from WF muxed data on cloud in accordance to some embodiments of this invention.

FIG. 19 depicts similar blocks as those in FIG. 3 to exemplify the concept of sharing among multiple devices for a user; illustrating a simple block diagram of storing data files on cloud 010 via a personnel device 139 which may be a PC or a notebook. There are three major blocks, preprocessing via a WF muxing 130 to generate two sets of muxed data Es(t) and Ed(t) before storing them on cloud, storing WF muxed data Es(t) and Ed(t) on cloud 010, and post-processing via a WF de-muxing 140 after retrieving them from cloud. A stored data file S(t) in the PC 139 is selected by the user to be shared for another devices of his or her via cloud. The preprocessor 130 performs a 2-to-2 WF muxing with S(t) and E5(t) as two inputs, generating two outputs Es(t) and Ed(t). The WF muxing feature a preferential weighting scheme so that the two digital muxed data outputs Es(t) and Ed(t) with a visual appearance nearly identical to that of E5(t). We are using visual appearance of the digital envelop E5(t) for packaging the digital data file S(t) differently in the Es(t) and Ed(t). In other embodiments, we may use other appearance of a digital envelop such as audios or multimedia formats to embedding digital data.

Figure 19A:
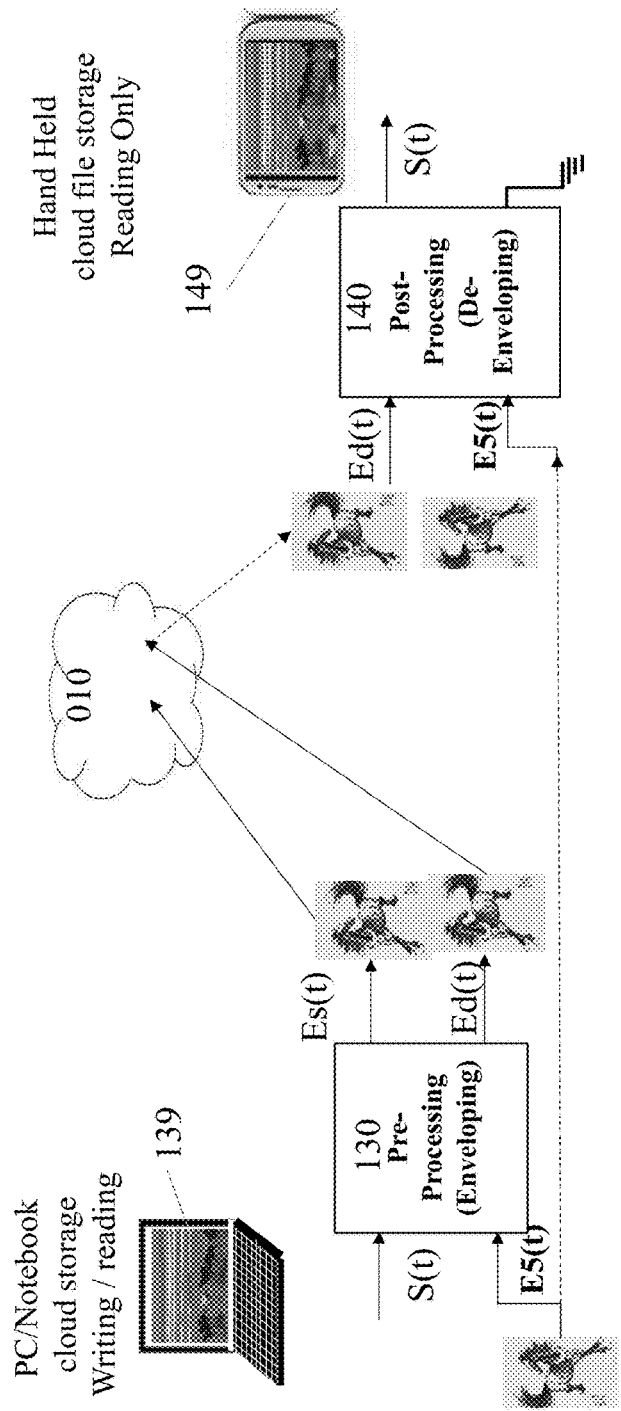
FIG. 19A illustrates another block diagram of storing WF muxed data on cloud with redundancy and retrieving information from a set of enveloped data on cloud in accordance to some embodiments of this invention.

It is very important to note that digital envelops are known for all intended devices for a given user. Both the Es(t) and Ed(t) will be uploaded to cloud. They may be stored in same storage site, most likely will be on different storage sites through various cloud storage operators. When restoring his/her data via different devices, the user shall retrieve both muxed files on cloud, Es(t) and Ed(t) first, and then performing a WF demuxing 140 on one of his/her other devices, say a smart phone 149, to recover the stored data S(t) and the original digital envelop E5(t). S(t) may then be displayed on the smart phone 149. The recovered E5(t), the selected digital envelop, may also be saved for later usage FIG. 19A depicts similar blocks as those in FIG. 19 to exemplify the concept of sharing among multiple devices for a user; illustrating a simple block diagram of storing data files on cloud 010 via a personnel device 139 which may be a PC or a notebook. There are three major blocks, preprocessing via a WF muxing 130 to generate two sets of muxed data Es(t) and Ed(t) before storing them on cloud, storing WF muxed data Es(t) and Ed(t) on cloud 010, and post-processing via a WF de-muxing 140 after retrieving them from cloud. A stored data file S(t) in the PC 139 is selected by the user to be shared for another devices of his or her via cloud. The preprocessor 130 performs a 2-to-2 WF muxing with S(t) and E5(t) as two inputs, generating two outputs Es(t) and Ed(t). The WF muxing feature a preferential weighting scheme so that the two digital muxed data outputs Es(t) and Ed(t) with a visual appearance nearly identical to that of E5(t). We are using visual appearance of the digital envelop E5(t) for packaging the digital data file S(t) differently in the Es(t) and Ed(t). In other embodiments, we may use other appearance of a digital envelop such as audios or multimedia formats to embedding digital data.

Both the Es(t) and Ed(t) will be uploaded to cloud. They may be stored in same storage site, most likely will be on different storage sites through various cloud storage operators.

When restoring his/her data via different devices, the user shall retrieve a first muxed files on cloud, Ed(t) first, and then performing a WF demuxing 140 with Ed(t) and a locally stored E5(t) on one of his/her other devices, say a smart phone 149, to recover the stored data S(t). S(t) may then be displayed on the smart phone 149.

Figure 19B:
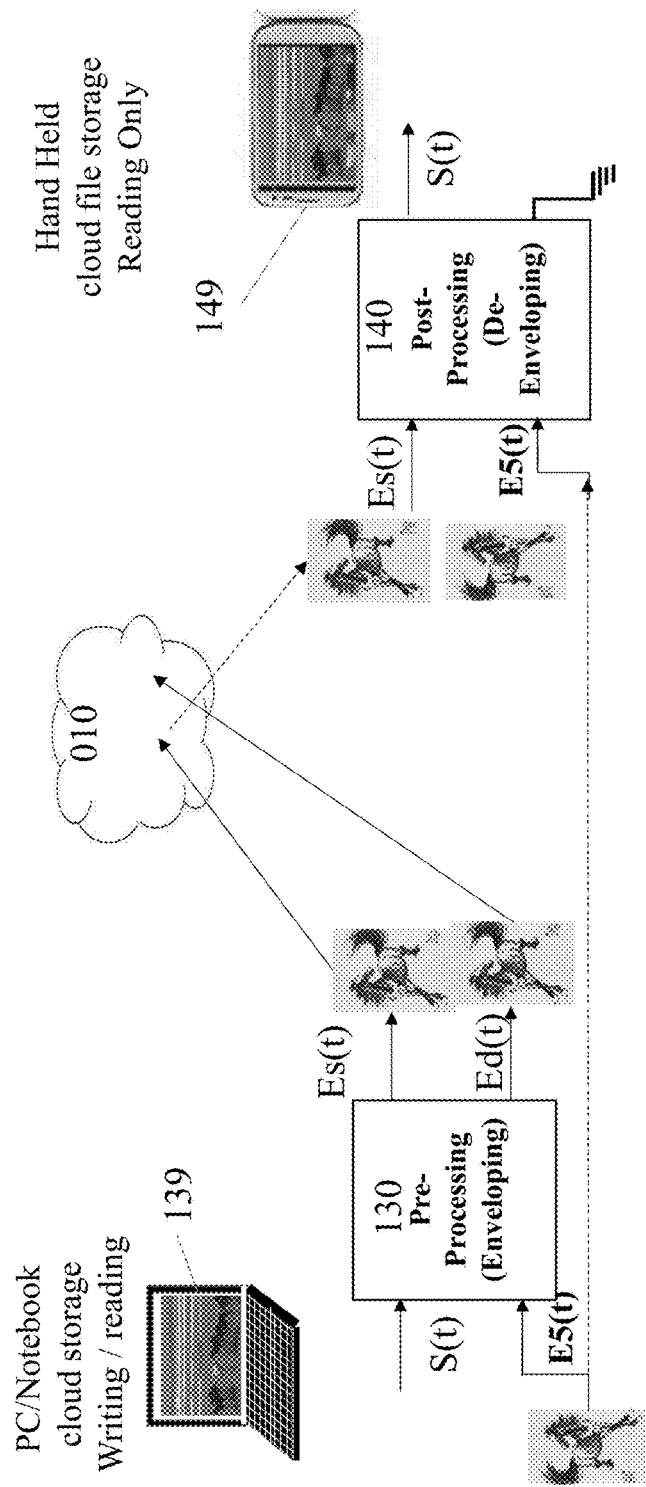
FIG. 19B illustrates another block diagram of storing enveloped data on cloud with redundancy and retrieving information from a set of enveloped data on cloud in accordance to some embodiments of this invention.

FIG. 19B depicts similar blocks as those in FIG. 19 to exemplify the concept of sharing among multiple devices for a user; illustrating a simple block diagram of storing data files on cloud 010 via a personnel device 139 which may be a PC or a notebook. There are three major blocks, preprocessing via a WF muxing 130 to generate two sets of muxed data Es(t) and Ed(t) before storing them on cloud, storing WF muxed data Es(t) and Ed(t) on cloud 010, and post-processing via a WF de-muxing 140 after retrieving them from cloud. A stored data file S(t) in the PC 139 is selected by the user to be shared for another devices of his or her via cloud. The preprocessor 130 performs a 2-to-2 WF muxing with S(t) and E5(t) as two inputs, generating two outputs Es(t) and Ed(t). The WF muxing feature a preferential weighting scheme so that the two digital muxed data outputs Es(t) and Ed(t) with a visual appearance nearly identical to that of E5(t). We are using visual appearance of the digital envelop E5(t) for packaging the digital data file S(t) differently in the Es(t) and Ed(t). In other embodiments, we may use other appearance of a digital envelop such as audios or multimedia formats to embedding digital data.

Both the Es(t) and Ed(t) will be uploaded to cloud. They may be stored in same storage site, most likely will be on different storage sites through various cloud storage operators.

When restoring his/her data via different devices, the user shall retrieve a first muxed files on cloud, Es(t) first, and then use Es(t) and stored E5(t) as inputs to performing a WF demuxing 140 on one of his/her other devices, say a smart phone 149, to recover the stored data S(t). S(t) may then be displayed on the smart phone 149.

Figure 19C:
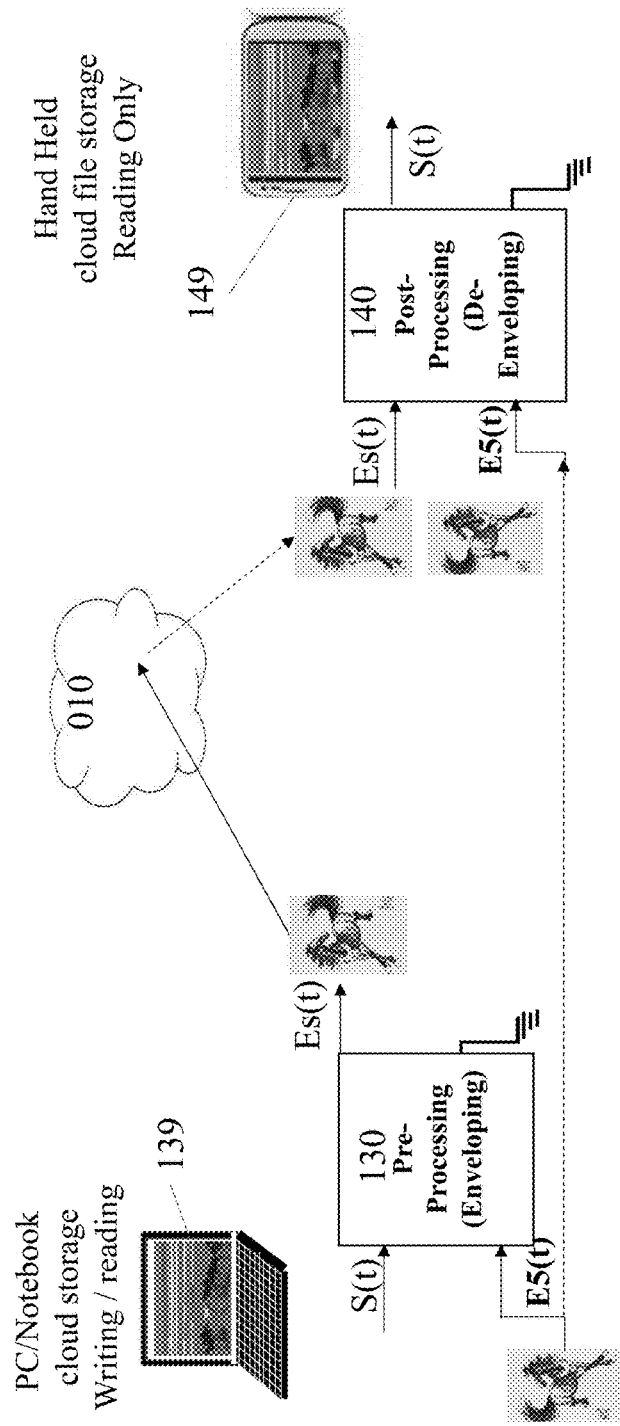
FIG. 19C illustrates another block diagram of storing enveloped data on cloud and retrieving information from enveloped data on cloud in accordance to some embodiments of this invention.

FIG. 19C depicts similar blocks as those in FIG. 19 to exemplify the concept of sharing among multiple devices for a user; illustrating a simple block diagram of storing data files on cloud 010 via a personnel device 139 which may be a PC or a notebook. There are three major blocks, preprocessing via a WF muxing 130 to generate two sets of muxed data Es(t) and Ed(t) before storing them on cloud, storing only one of the two WF muxed data Es(t) and Ed(t) on cloud 010, and post-processing via a WF de-muxing 140 after retrieving the stored WF muxed data from cloud. A stored data file S(t) in the PC 139 is selected by the user to be shared for another devices of his or her via cloud. The preprocessor 130 performs a 2-to-2 WF muxing with S(t) and E5(t) as two inputs, generating two outputs Es(t) and Ed(t). The WF muxing feature a preferential weighting scheme so that the two digital muxed data outputs Es(t) and Ed(t) with a visual appearance nearly identical to that of E5(t). We are using visual appearance of the digital envelop E5(t) for packaging the digital data file S(t) differently in the Es(t) and Ed(t). In other embodiments, we may use other appearance of a digital envelop such as audios or multimedia formats to embedding digital data.

Only one of the Es(t) and Ed(t) will be uploaded to cloud 010 and the information stored and transport on cloud without a priori knowledge of the digital envelope will not be enough for reconstituting the embedded data file S(t).

When restoring his/her data via different devices, the user shall retrieve a muxed files on cloud, Es(t) or Ed(t) first, and then use it and stored digital envelop E5(t) as inputs to performing a WF demuxing 140 on one of his/her other devices, say a smart phone 149, to recover the stored data S(t). S(t) may then be displayed on the smart phone 149.

Embodiment 12

Figure 20:
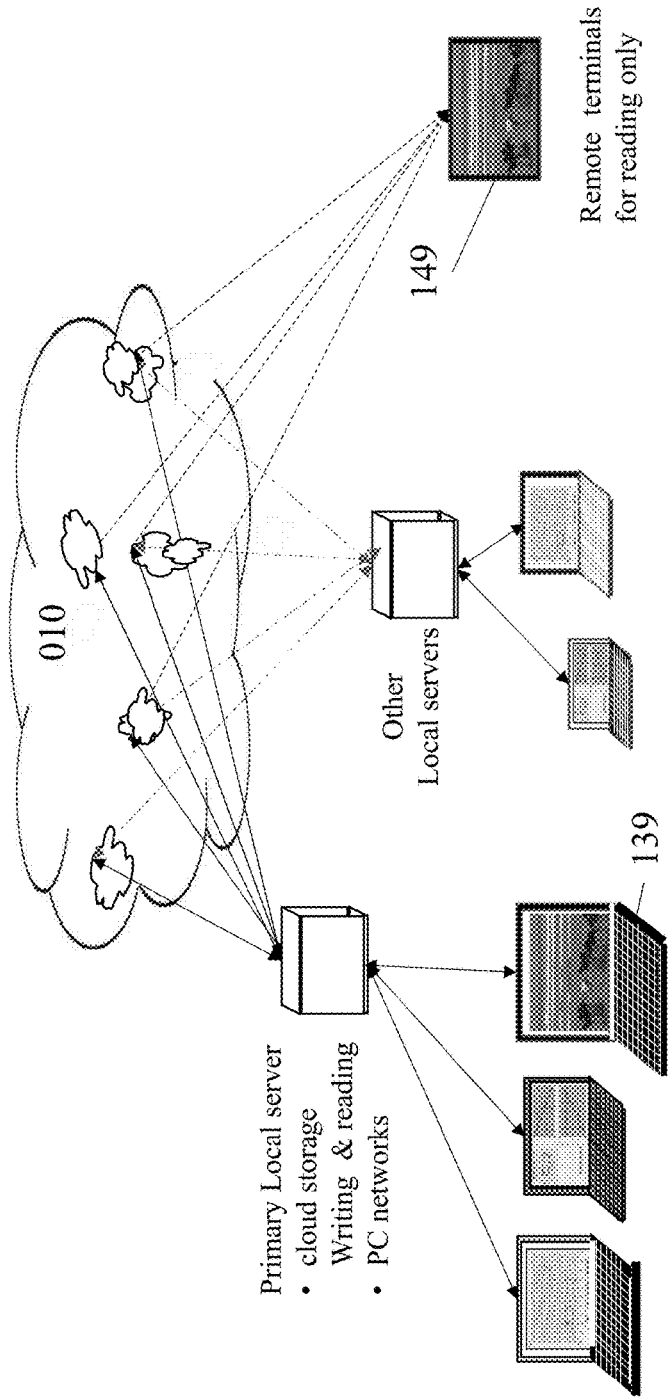
FIG. 20 illustrates a block diagram of enveloping information data and then storing them on cloud via a device of one user and retrieving information from enveloped data on cloud via another device of the user in accordance to some embodiments of this invention.

FIG. 20 depicts a top level privacy protections on personnel information sharing among multiple devices of a user during data transport and storage on cloud. Cloud computing enables a user access all his/her applications and documents from anywhere in the world, freeing the user from the confines of the desktop and facilitating wholesale group collaboration. But sharing among multiple users in cloud computing isn't for every application; there are pros and cons to this type of web-based computing. On the other hand, there are many cloud applications for information sharing among multiple devices or equipment of one user. The stored private information is personal data or data collected for a user own convenience, and not for sharing with other persons. Enveloping and de-enveloping are techniques for enhanced privacy protections on data storage and transport on cloud 010. The example depicted in FIG. 20 features stored enveloped data or a video clip processed by a PC or a notebook 139 on a desk in the user office and stored on cloud 010. The retrieved data or the video clip may be reconstituted from the user cell phone or IPad 149 in a different city at a later time. It is very important to note that digital envelops are known for all intended devices for a given user.

Figure 20A:
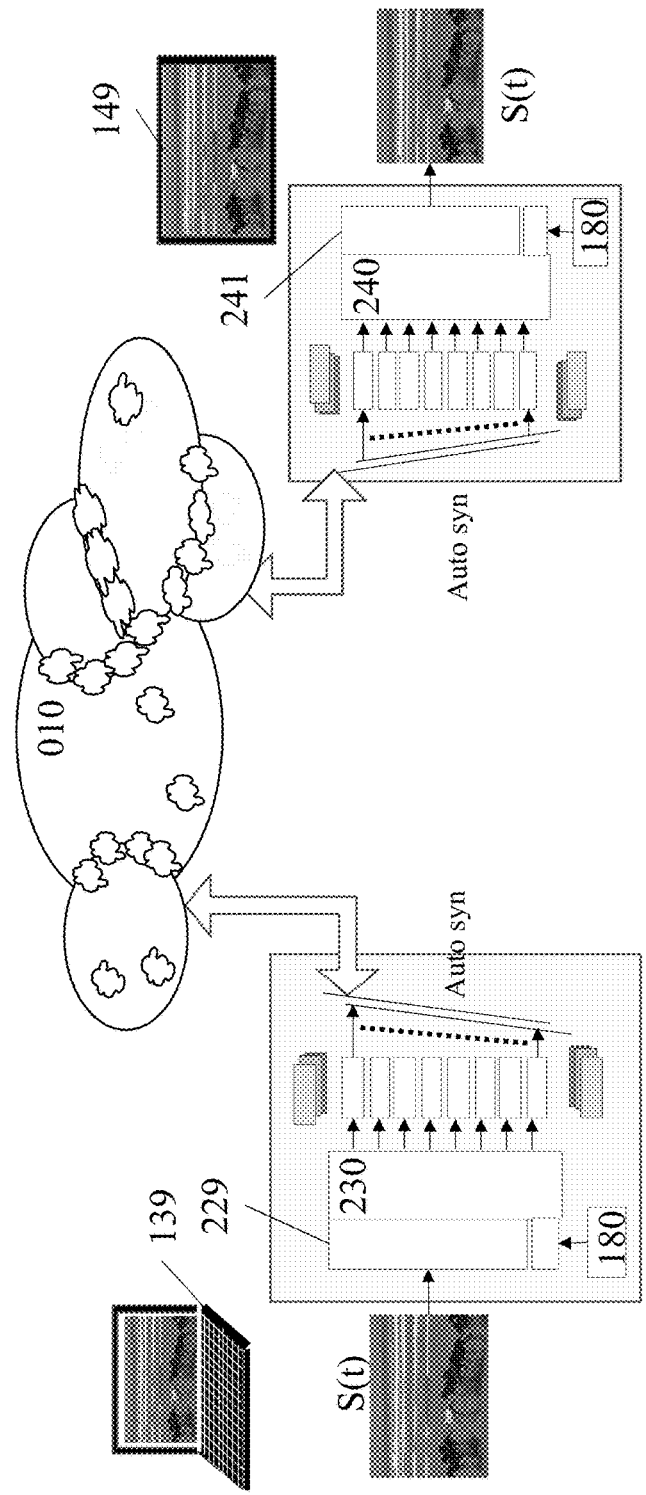
FIG. 20A illustrates a block diagram of storing enveloped information data on cloud via a device of one user and retrieving enveloped data on cloud via another device of the user in accordance to some embodiments of this invention.

FIG. 20A depicts similar blocks as those in FIG. 19 to exemplify the concept of sharing among multiple devices for a user; illustrating a simple block diagram of storing data files on cloud 010 via a personnel device 139 which may be a PC or a notebook. There are three major blocks, preprocessing via a M-to-M WF muxing 230 to generate sets of muxed data before storing them on cloud, storing multiple sets of WF muxed data on cloud 010, and post-processing via a M-to-M WF de-muxing 240 after retrieving them from cloud.

A stored data file S(t) in the PC 139 is selected by the user to be shared for other devices of his or her own via cloud. S(t) is segmented into M−1 groups first by a segmentation device 229 which may be a TDM demuxer or a serial-to-parallel convertor. The preprocessor 230 performs a M-to-M WF muxing with S(t) using selected M−1 input ports and a digital envelope file from a local candidate envelope folder 180 as remaining last input, generating M WF-Muxed outputs. The WF muxing feature a preferential weighting scheme so that M digital muxed data outputs with a visual appearance nearly identical to that of the digital envelope. We are using visual appearance of the selected digital envelop for packaging the digital data file S(t) differently in all muxed files. In other embodiments, we may use other appearance of a digital envelop such as audios or multimedia formats to embedding digital data.

All the M muxed outputs will be uploaded to cloud. They may be stored in same storage site, most likely will be on different storage sites through various cloud storage operators.

When restoring his/her data via different devices, the user shall retrieve any M−1 from M muxed files on cloud and then performing a M-to-M WF demuxing 240 with the retrieved M−1 data file and the selected digital envelope locally stored in the envelope candidate folder 180 on one of his/her other devices, say an Ipad 149. To recover the stored data S(t), a M−1 to 1 de-segmentation process 241 will be followed the WF demuxing operation. S(t) may then be displayed on the IPad 149.

Figure 20B:
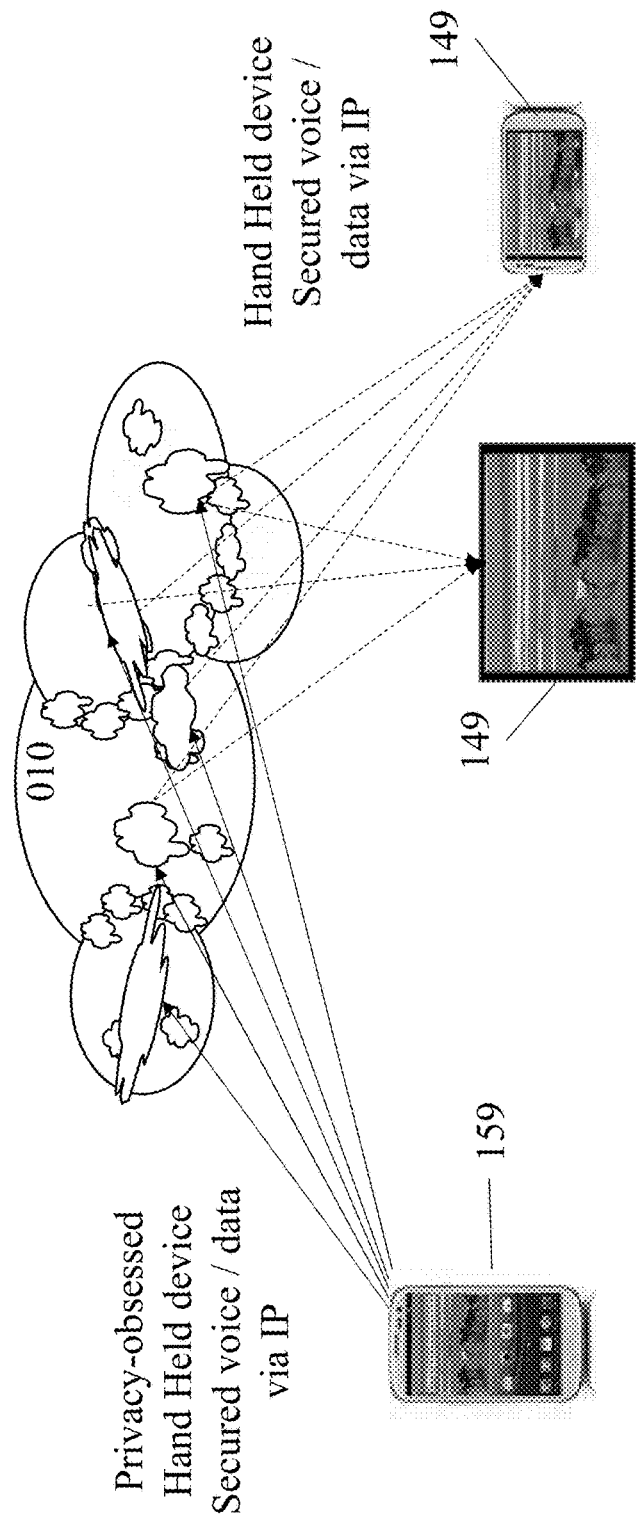
FIG. 20B illustrates a block diagram of storing enveloped information data on cloud via a device of one user and retrieving enveloped data on cloud via another device of the user in accordance to some embodiments of this invention.

FIG. 20B depicts similar blocks as those in FIG. 20A to exemplify the concept of sharing among multiple devices for a user; illustrating a simple block diagram of storing data files on cloud 010 via a personnel device 139 which may be a smart phone. There are three personal devices; the first one is a smart phone 159 with both "writing" and "reading" capability. The other two 149 are with reading capability only; a second smart phone, and an Ipad. The device 159 with writing capability features a similar preprocessing as that in FIG. 20A via a WF muxing 230 to generate sets of muxed data before storing them on cloud. Those 159 and 149 with reading capability shall feature a post-processing each via a WF de-muxing 240 after retrieving WF muxed data from cloud.

Figure 20C:
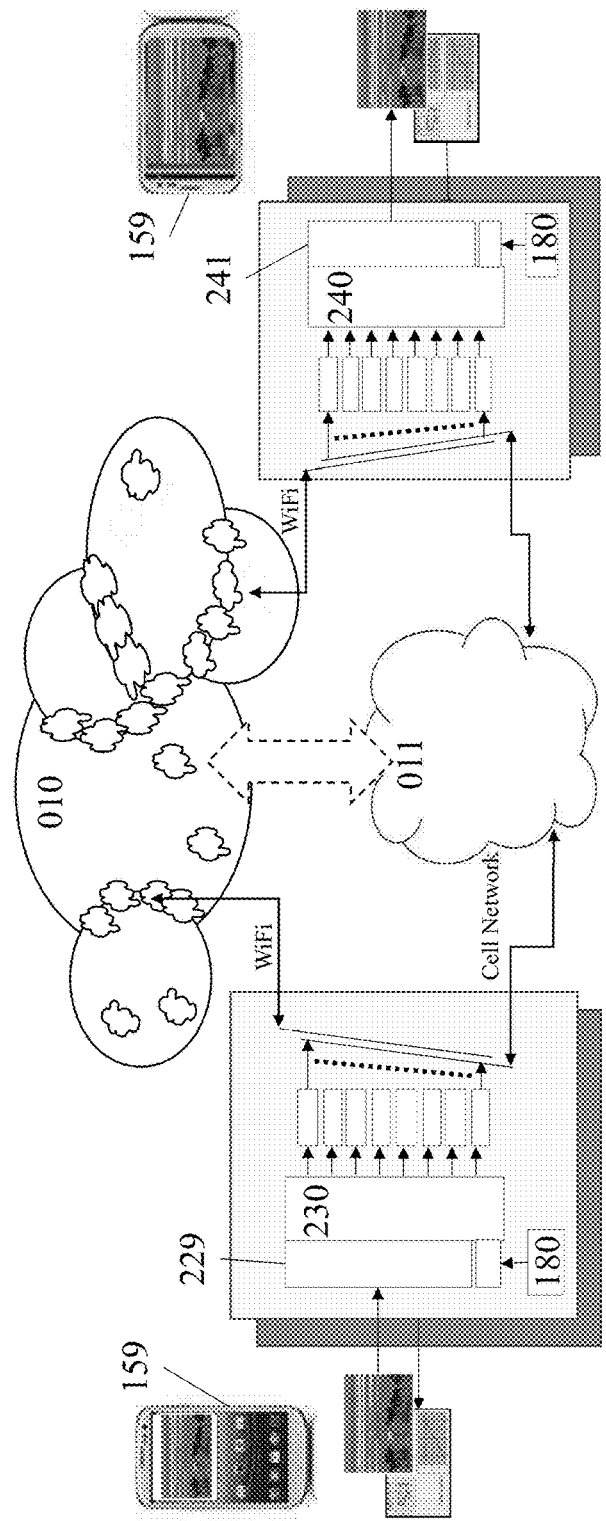
FIG. 20C illustrates a block diagram of storing enveloped information data on cloud via a handheld device of one user and retrieving enveloped data on cloud via another handheld device of the user in accordance to some embodiments of this invention.

FIG. 20C depicts similar blocks as those in FIG. 20A to exemplify the concept of sharing among multiple devices for a user. It shows a simple block diagram of "writing" or storing data files on cloud 010 via a smart phone 159 and "reading" or retrieving the same data files from cloud later at different cities via the same smart phone 159 or a different devices. In writing, a data file S(t) is segmented into M−1 groups first by a segmentation device 229, which may be TDM demuxer. The preprocessor 230 performs a M-to-M WF muxing with S(t) using selected M−1 input ports and a digital envelope file from a local candidate envelope folder 180 as remaining last input, generating M WF-Muxed outputs. The WF muxing feature a preferential weighting scheme so that M digital muxed data outputs with a visual appearance nearly identical to that of the digital envelope. We are using visual appearance of the selected digital envelop for packaging the digital data file S(t) differently in all muxed files. In other embodiments, we may use other appearance of a digital envelop such as audios or multimedia formats to embedding digital data. The device 159 may do "writing" (uploading) and "reading" (downloading) independently.

All the M muxed outputs will be uploaded to cloud via both WiFi, and cell phone networks concurrently. They may be stored in same storage site, most likely will be on different storage sites through various cloud storage operators.

When restoring his/her data, the user shall retrieve any M−1 from M muxed files on cloud and then performing a M-to-M WF demuxing 240 with the retrieved M−1 data file and the selected digital envelop locally stored in the envelope candidate folder 180 on one of his/her smart phone 159 or other devices, say an IPad 149 in FIG. 20. To recover the stored data S(t), a M−1 to 1 de-segmentation process 241 will be followed the WF demuxing operation 240. S(t) may then be displayed on the IPad 149. There is a redundancy feature in this example.

On the other hand, when the user forgot to synchronize the selected envelop among various devices or when the selected digital envelop is not available on the retrieving device, the user may use all M stored enveloped files on cloud to restore the data file S(t) and the selected digital envelop. This will be a technique for the user to access the selected digital envelop via cloud. The restored digital envelop may then be stored for later retrieving applications to different files stored on cloud via the same digital envelop.

Furthermore, when the digital envelop become available for retrieving stored data files, it is also viable for the user to check the integrity of the stored data either occasionally or continuously. The user will retreat all M enveloped files stored on cloud, and perform WF demuxing to regenerate S'(t) and a regenerated digital envelop. The user may make comparison of the regenerated digital envelop to the available and known-a-priori digital envelop file. When they are identical, the comparison result is a good indication that the restored data file S'(t) is the recovered S(t). On the other hand, when there are differences, the regenerated S'(t) has been compromised.

In other embodiments, a data file S(t) in the "writing" to cloud 010 is segmented into M−x groups first by a segmentation device 229, which may be TDM demuxer. The pre-processor 230 performs a M-to-M WF muxing with S(t) using selected M−x input ports and y digital envelope files from a local candidate envelope folder 180 using remaining x inputs, generating M WF-Muxed outputs, where x and y are positive integer and x≥y≥1. The WF muxing feature a preferential weighting scheme so that M digital muxed data outputs with a visual appearance nearly identical to that of one of the digital envelopes. We are using visual appearance of the selected digital envelop for packaging the digital data file S(t) differently in all muxed files. In other embodiments, we may use other appearance of a digital envelop such as audios or multimedia formats to embedding digital data. The device 159 may do "writing" (uploading) and "reading" (downloading) independently. It is very important to note that digital envelops are known for all intended devices for a given user.

All the M muxed outputs will be uploaded to cloud via both WiFi, and cell phone networks concurrently. They may be stored in same storage site, most likely will be on different storage sites through various cloud storage operators.

When restoring his/her data, the user shall retrieve any M−y from M muxed files on cloud and then performing a M-to-M WF demuxing 240 with the retrieved M−y data file and the selected y digital envelops locally stored in the envelope candidate folder 180 on one of his/her smart phone 159 or other devices, say an IPad 149 in FIG. 20. To recover the stored data S(t), a M−x to 1 de-segmentation process 241 will be followed the WF demuxing operation 240. S(t) may then be displayed on the IPad 149. There are redundancies in this example.

On the other hand, when the user forgot to synchronize the selected envelop among various devices or when the selected digital envelops are not all available on the retrieving device, the user may use all M stored enveloped files on cloud to restore the data file S(t) and the all selected digital envelops. This will be a technique for the user to access all the selected digital envelops via cloud. The restored digital envelops may then be stored locally for later retrieving applications to different files stored on cloud via the same digital envelops.

Furthermore, when the digital envelop become available for retrieving stored data files, it is also viable for the user to check the integrity of the stored data either occasionally or continuously. The user will retreat all M enveloped files stored on cloud, and perform WF demuxing to regenerate S'(t) and a regenerated digital envelop. The user may make comparison of the regenerated digital envelops to the available and known-a-priori digital envelop file. When they are identical, the comparison result is a good indication that the restored data file S'(t) is the recovered S(t). On the other hand, when there are differences, the results indicate the regenerated S'(t) has been compromised.

In other embodiments, a data file S(t) in the "writing" to cloud 010 is segmented into M−x groups first by a segmentation device 229, which may be TDM demuxer. The pre-processor 230 performs a M-to-M WF muxing with S(t) using selected M−x input ports and y digital envelope files from a local candidate envelope folder 180 using remaining x inputs, generating M WF-Muxed outputs, where x and y are positive integer and x≥y≥1. There are x−y inputs grounded. The WF muxing feature a preferential weighting scheme so that M digital muxed data outputs with a visual appearance nearly identical to that of one of the digital envelopes. We are using visual appearance of the selected digital envelop for packaging the digital data file S(t) differently in all muxed files. In other embodiments, we may use other appearance of a digital envelop such as audios or multimedia formats to embedding digital data. The device 159 may do "writing" (uploading) and "reading" (downloading) independently.

Only M−x muxed outputs will be uploaded to cloud via both WiFi, and cell phone networks concurrently. They may be stored in same storage site, most likely will be on different storage sites through various cloud storage operators.

When restoring his/her data, the user shall retrieve all M−x files on cloud and then performing a M-to-M WF demuxing 240 with the retrieved M−x data files, x−y zero inputs and the selected y digital envelops locally stored in the envelop candidate folder 180 on one of his/her smart phone 159 or other devices, say an IPad 149 in FIG. 20. To recover the stored data S(t), a (M−x) to 1 de-segmentation process 241 will be followed the WF demuxing operation 240. S(t) may then be displayed on the IPad 149. There are no redundancies in this example.

It is also possible to upload N muxed outputs to cloud via both WiFi, and cell phone networks concurrently, where N is an integer and N>(M−x). They may be stored in same storage site, most likely will be on different storage sites through various cloud storage operators. There are N−(M−x) redundancy. When restoring his/her data, the user shall retrieve M−x files from a total N stored files on cloud and then performing a M-to-M WF demuxing 240 with the retrieved M−x data file, x−y zero inputs and the selected y digital envelops locally stored in the envelop candidate folder 180 on one of his/her smart phone 159 or other devices, say an IPad 149 in FIG. 20. To recover the stored data S(t), a (M−x) to 1 de-segmentation process 241 will be followed the WF demuxing operation 240. S(t) may then be displayed on the IPad 149.

Additional Comments

With regards to the above applications via WF muxing, a WF muxer may alternatively perform a first non-orthogonal matrix on the inputs of the WF muxer. With regards to the above WF demuxing applications, a WF demuxer may alternatively perform a second non-orthogonal matrix, inverse to the first non-orthogonal matrix, on the inputs of the WF muxer.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A system comprising:
    a plurality of personal devices identified by at least one remote network storage as belonging to a user, the personal devices comprising at least a first personal device;
    wherein the first personal device comprises:
        a first folder for storing a known a priori digital file;
        a second folder for storing a data file;
        a first processor coupled to the first folder and the second folder, the first processor being configured to receive M first input files, M being a positive integer greater than 1, perform an M-to-M wavefront multiplexing transformation on the M first input files and generate M first output files such that each of the M first output files comprises a unique linear combination of the M first input files having a scale factor, the M first input files comprising the data file and the known a priori digital file; and
        a first network interface configured to communicate with the at least one remote network storage and to send at least M minus 1 of the M first output files to at least one destination in the at least one remote network storage for storage,
    wherein the known a priori digital file is known to a device configured to access the at least one destination to recover the data file from a subset of the at least M minus 1 of the M first output files, and
    wherein the scale factor is applied to the known a priori digital file in the M first input files such that at least one of the M first output files appears to human perception as having identical visual or audio features to the known a priori digital file.

2. The system of claim 1, wherein the personal devices further comprise a second personal device, the second personal device comprising:
    a second network interface configured to communicate with the at least one remote network storage and to retrieve M minus 1 of the at least M minus 1 first output files that have been stored at the at least one destination in the at least one remote network storage;
    a third folder for storing the known a priori digital file; and
    a second processor coupled to the second network interface and the third folder, the second processor receiving the retrieved M minus 1 first output files and the known a priori digital file, performing an M-to-M wavefront de-multiplexing transformation on the retrieved M minus 1 first output files and the known a priori digital file, and generating M second output files such that each of the M second output files comprises a unique linear combination of the retrieved M minus 1 first output files and the known a priori digital file, the M-to-M wavefront de-multiplexing transformation being an inverse of the M-to-M wavefront multiplexing transformation.

3. The system of claim 2, wherein the second personal device further comprises:
    a de-segmentation device coupled to the second processor, the de-segmentation device being configured to de-segment M minus 1 of the M second output files into one recovered file corresponding to the data file.

4. The system of claim 1, wherein the first personal device further comprises:
    a segmentation device coupled to the first processor, the segmentation device being configured to segment the data file into M minus 1 segmented files and provide the M minus 1 segmented files concurrently to the first processor as M minus 1 of the M first inputs.

5. The system of claim 4, wherein the segmentation device comprises a time division demultiplexer.

6. The system of claim 1, wherein the first network interface sends the at least M minus 1 of the M first output files to more than one destinations in the at least one remote network storage to be stored all together or not all together.

7. The system of claim 1, wherein the M-to-M wavefront multiplexing transformation comprises an orthogonal matrix transformation.

8. A system comprising:
    a plurality of personal devices identified by at least one remote network storage as belonging to a user, the personal devices comprising at least a first personal device;
    wherein the first personal device comprises:
        a first folder for storing Y known a priori digital files, Y being a positive integer greater than or equal to 1;
        a second folder for storing a data file;
        a first processor coupled to the first folder and the second folder, the processor being configured to receive M first input files, M being a positive integer greater than Y, performing an M-to-M wavefront multiplexing transformation on the M first input files and generate M first output files such that each of the M first output files comprises a respective linear combination of the M first input files having a scale factor, the M first input files comprising the data file and the Y known a priori digital files; and a first network interface configured to communicate with the at least one remote storage network and to send the M first output files to at least one destination in the at least one remote network storage for storage, wherein the Y known a priori digital files are known to a device configured to access the at least one destination to recover the data file from a subset of the M first output files, and wherein the scale factor is applied to the known a priori digital file in the M first input files such that at least one of the M first output files appears to human perception as having identical visual or audio features to the known a priori digital file.

9. The system of claim 8, wherein the personal devices further comprise a second personal device, the second personal device comprising:

a second network interface configured to communicate with the at least one remote network storage and to retrieve M minus Y of the M first output files that have been stored at the at least one destination in the at least one remote network storage;

a third folder for storing the Y known a priori digital files; and a second processor coupled to the second network interface and the third folder, the second processor receiving the retrieved M minus Y first output files and the Y known a priori digital files, performing an M-to-M wavefront de-multiplexing transformation on the retrieved M minus Y first output files and the Y known a priori digital files, and generating M second output files such that each of the M second output files comprises a unique linear combination of the retrieved M minus Y first output files and the Y known a priori digital files, the M-to-M wavefront de-multiplexing transformation being an inverse of the M-to-M wavefront multiplexing transformation.

10. The system of claim 9, wherein the second personal device further comprises:

a de-segmentation device coupled to the second processor, the de-segmentation device being configured to de-segment M minus X of the M second output files into one recovered file corresponding to the data file, X being a positive integer greater than or equal to Y.

11. The system of claim 8, wherein the first personal device further comprises:

a segmentation device coupled to the first processor, the segmentation device being configured to segment the data file into M minus X segmented files, X being a positive integer greater than or equal to Y, and provide the M minus X segmented files concurrently to the first processor as M minus X of the M first input files.

12. The system of claim 11, wherein the segmentation device comprises a time division demultiplexer.

13. The system of claim 8, wherein the M-to-M wavefront multiplexing transformation comprises an orthogonal matrix transformation or a non-orthogonal full-rank matrix transformation.

14. A system comprising:

a plurality of personal devices identified by at least one remote storage network as belonging to a user, the personal devices comprising at least a first personal device;

wherein the first personal device comprises:

a first folder for storing Y known a priori digital files, Y being a positive integer greater than or equal to 1;

a second folder for storing a data file;

a segmentation device coupled to the second folder, the segmentation device being configured to segment the data file into M minus X segmented files, M being a positive integer greater than X and X being a positive integer greater than or equal to Y;

a first processor coupled to the first folder and the segmentation device, the processor being configured to receive M first input files, M being a positive integer greater than Y, performing an M-to-M wavefront multiplexing transformation on the M first input files and generate M first output files such that each of the M first output files comprises a unique linear combination of the M first input files having a scale factor, the M first input files comprising the M minus X segmented files, the Y known a priori digital files and X minus Y null inputs; and a first network interface configured to communicate with the at least one remote network storage and to send at least M minus X of the M first output files to at least one destination in the at least one remote network storage for storage, wherein the Y known a priori digital files are known to a device configured to access the at least one destination to recover the data file from a subset of the at least M minus X of the M first output files, and wherein the scale factor is applied to the known a priori digital file in the M first input files such that at least one of the M first output files appears to human perception as having identical visual or audio features to the known a priori digital file.

15. The system of claim 14, wherein the personal devices further comprise a second personal device, the second personal device comprising:

a second network interface configured to communicate with the at least one remote network storage and to retrieve M minus X of the at least M minus X first output files that have been stored at the at least one destination in the at least one remote network storage;

a third folder for storing the Y known a priori digital files; and a second processor coupled to the second network interface and the third folder, the second processor receiving, as M second input files, the retrieved M minus X first output files, the Y known a priori digital files and X minus Y zero inputs, performing an M-to-M wavefront de-multiplexing transformation on the M second input files, and generating M second output files such that each of the M second output files comprises a unique linear combination of the retrieved M minus X first output files and the Y known a priori digital files, the M-to-M wavefront de-multiplexing transformation being an inverse of the M-to-M wavefront multiplexing transformation; and a de-segmentation device coupled to the second processor, the de-segmentation device de-segmenting M minus X of the M second output files into one recovered file corresponding to the data file.

16. The system of claim 14, wherein the segmentation device comprises a time division demultiplexer.

17. The system of claim 14, wherein the M-to-M wavefront multiplexing transformation comprises an orthogonal matrix transformation.

18. The system of claim 14, wherein the M-to-M wavefront multiplexing transformation comprises an orthogonal matrix transformation or a non-orthogonal full-rank matrix transformation.

19. The system of claim 14, wherein the first network interface retrieves M minus X first output files of the at least M minus X of the M first output files stored at the at least one destination in the at least one remote network storage.

20. The system of claim 19, wherein the first personal device further comprises:
- a third processor coupled to the first network interface and the first folder, the third processor receiving, as M third input files, the retrieved M minus X first output files, the Y known a priori digital files and X minus Y zero inputs, performing an M-to-M wavefront de-multiplexing transformation on the M third input files, and generating M third output files such that each of the M third output files comprises a unique linear combination of the retrieved M minus X first output files and the Y known a priori digital files, the M-to-M wavefront de-multiplexing transformation being an inverse of the M-to-M wavefront multiplexing transformation; and
- a de-segmentation device coupled to the third processor, the de-segmentation device de-segmenting M minus X of the M third output files into one recovered file corresponding to the data file.

\* \* \* \* \*